(12) United States Patent
Ishihara et al.

(10) Patent No.: US 11,561,737 B2
(45) Date of Patent: Jan. 24, 2023

(54) I/O COMMAND CONTROL APPARATUS AND STORAGE SYSTEM

(71) Applicant: Kioxia Corporation, Tokyo (JP)

(72) Inventors: Takeshi Ishihara, Yokohama Kanagawa (JP); Yoshihiro Ohba, Kawasaki Kanagawa (JP); Atsushi Ohba, Kawasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/472,459

(22) Filed: Sep. 10, 2021

(65) Prior Publication Data

US 2022/0283742 A1 Sep. 8, 2022

(30) Foreign Application Priority Data

Mar. 5, 2021 (JP) .............................. JP2021-035582

(51) Int. Cl.
*G06F 3/06* (2006.01)

(52) U.S. Cl.
CPC .......... *G06F 3/0659* (2013.01); *G06F 3/0611* (2013.01); *G06F 3/0622* (2013.01); *G06F 3/0629* (2013.01); *G06F 3/0679* (2013.01)

(58) Field of Classification Search
None
See application file for complete search history.

(56) References Cited

U.S. PATENT DOCUMENTS

| | | |
|---|---|---|
| 7,392,393 B2 | 6/2008 | Taki |
| 7,415,723 B2 | 8/2008 | Pandya |
| 7,523,490 B2 | 4/2009 | Guo et al. |
| 7,865,718 B2 | 1/2011 | Fukuta et al. |
| 8,001,349 B2 | 8/2011 | Ozaki et al. |
| 10,423,575 B2 | 9/2019 | Hack et al. |
| 10,691,417 B2 | 6/2020 | Souri et al. |

(Continued)

FOREIGN PATENT DOCUMENTS

| | | |
|---|---|---|
| JP | 2008-112343 A | 5/2008 |
| JP | 4186466 B2 | 11/2008 |
| JP | 4823015 B2 | 11/2011 |

OTHER PUBLICATIONS

Hardt, D., Ed., "The OAuth 2.0 Authorization Framework", RFC 6749, Oct. 2012, pp. 1-76.

(Continued)

*Primary Examiner* — Edward J Dudek, Jr.
*Assistant Examiner* — Ralph A Verderamo, III
(74) *Attorney, Agent, or Firm* — Allen & Overy LLP

(57) ABSTRACT

According to one embodiment, an I/O command control apparatus receives authorization information. The authorization information indicates whether or not to permit an execution of an I/O command. The apparatus verifies whether the received authorization information is not tampered with, and whether the received authorization information is issued from a known authorization server. In a case where the authorization information is not tampered with, and is issued from the known server, the apparatus verifies whether or not the authorization information permits to execution of the I/O command. The apparatus permits or prohibits the execution of the I/O command or execution of a control command generated from the I/O command, based on the authorization result.

16 Claims, 21 Drawing Sheets

(56) References Cited

U.S. PATENT DOCUMENTS

| | | | |
|---|---|---|---|
| 11,050,570 B1* | 6/2021 | Totah | H04L 9/3215 |
| 11,362,830 B2* | 6/2022 | Kanbe | G06F 21/78 |
| 2004/0165588 A1 | 8/2004 | Pandya | |
| 2009/0235328 A1 | 9/2009 | Kuo et al. | |
| 2010/0125670 A1* | 5/2010 | Dondeti | H04L 67/104 |
| | | | 709/229 |
| 2013/0305028 A1* | 11/2013 | Mo | G06F 21/572 |
| | | | 713/193 |
| 2019/0087159 A1 | 3/2019 | Souri et al. | |
| 2020/0117517 A1 | 4/2020 | Costa et al. | |
| 2020/0117518 A1 | 4/2020 | Costa et al. | |
| 2020/0117520 A1 | 4/2020 | Costa et al. | |

OTHER PUBLICATIONS

Scott Shadley et al., "What happens when Compute meets Storage?", Sep. 2019, pp. 1-28.
Scott Shadley et al., "Computational Storage—Part of the Evolving Ecosystem", May 10, 2019, pp. 1-32.
Intel Corporation, "Infrastructure Processing Unit (IPU)", 2020, 7 pages, w/Machine Translation.
Mellanox Technologies, "Security in Mellanox Technologies InfiniBand Fabrics—Technical Overview", 3861WP Rev 1.0, 2012, pp. 1-7.
OpenStack Foundation "Storlets ACLs", 2013, 2 pages.
ScaleFlux, Inc., "ScaleFlux Computational Storage", 2020, 2 pages.
Servants international Corporation, "NVIDIA Mellanox Bluefield Multi-Core System-on-Chip (SoC)", 2020, 1 page, w/Machine Translation.

* cited by examiner

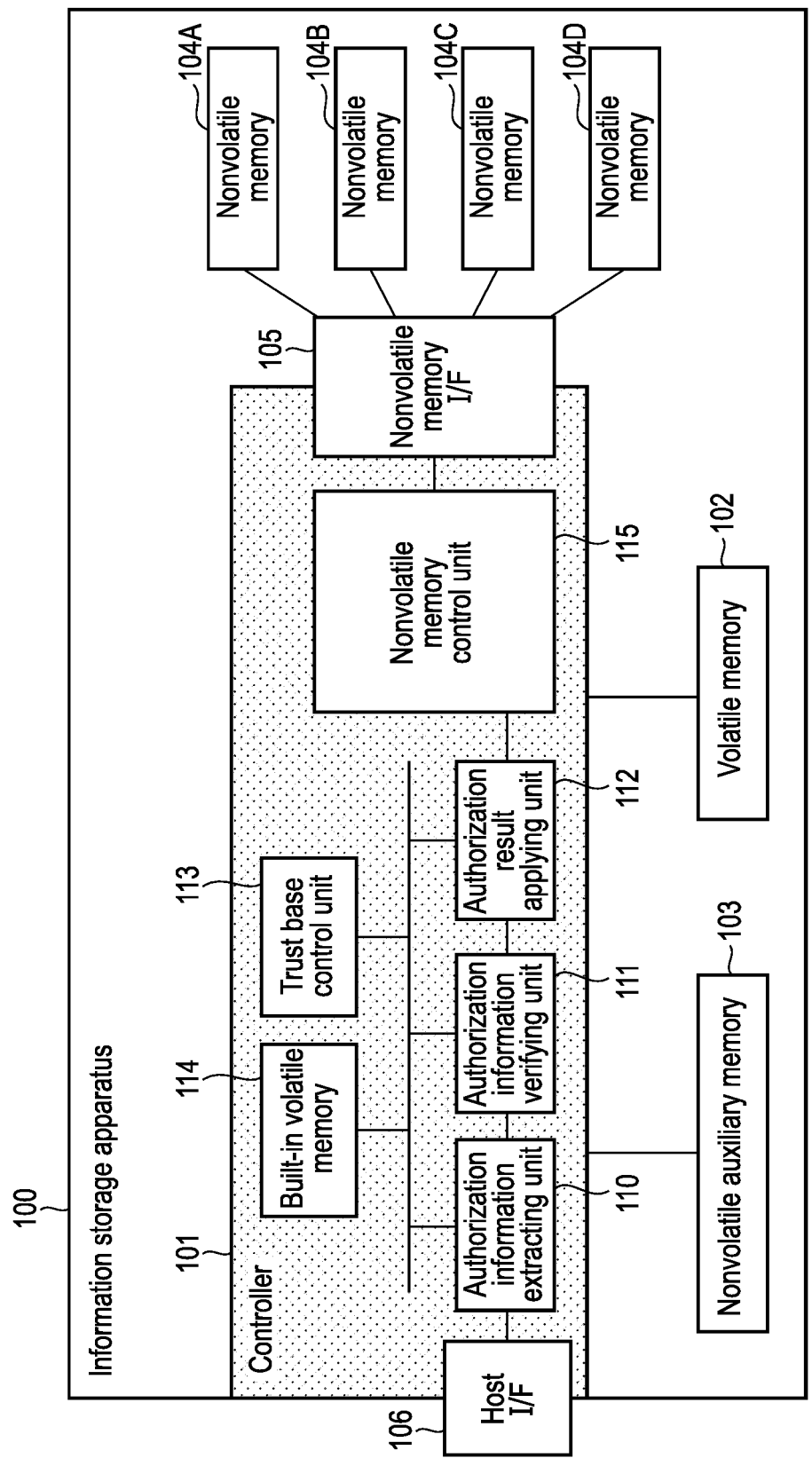
F I G. 1

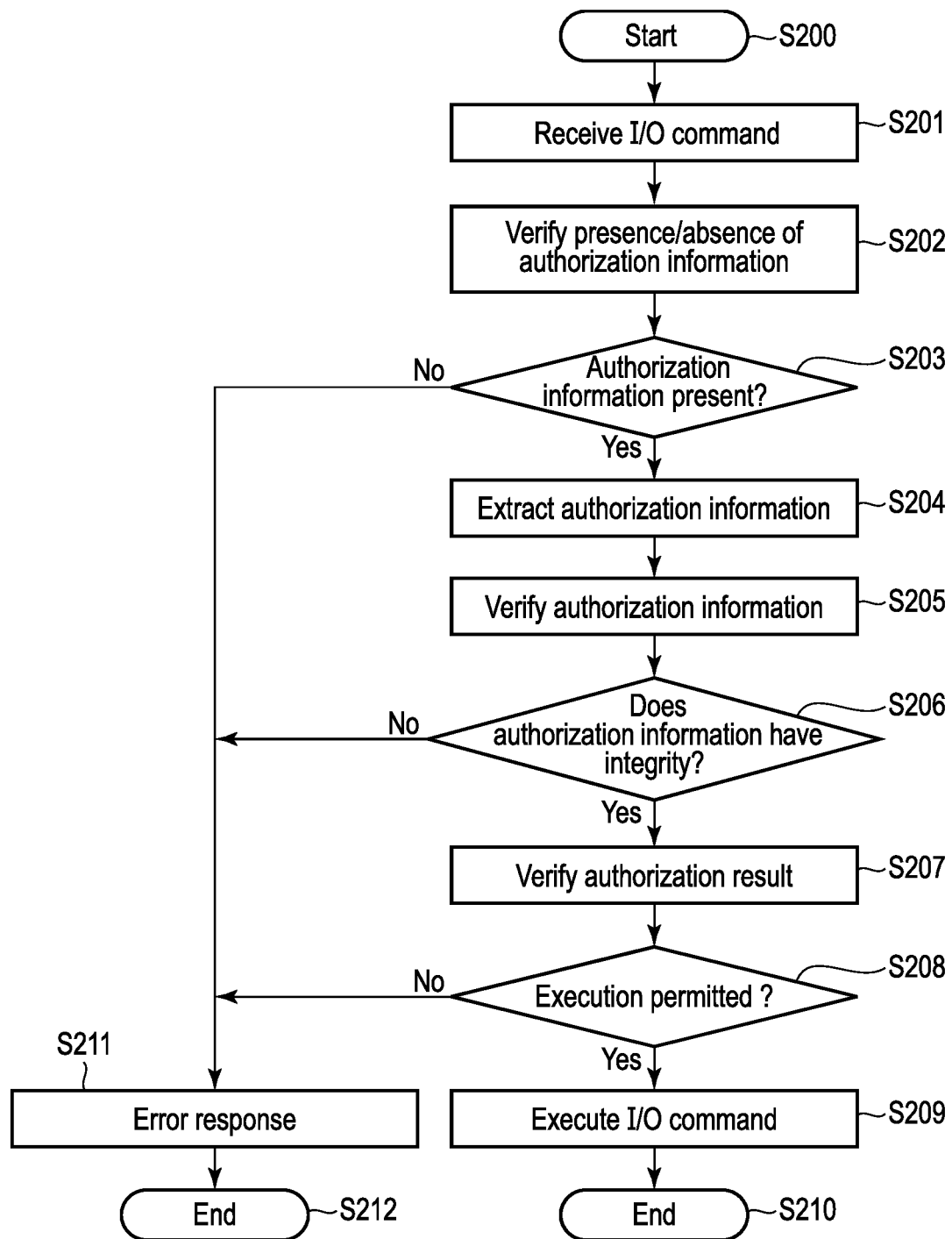
F I G. 2

| | 300 | 301 | 302 | 303 | 304 |
|---|---|---|---|---|---|
| | Expiration date | Target I/O command | Authorization target object | Authorization time | Referable period/ storage period |
| 310— | T11 | READ | OBJ1 | T12 | T13 |
| 311— | T21 | WRITE | OBJ2 | T22 | T23 |
| | ⋮ | ⋮ | ⋮ | ⋮ | ⋮ |

F I G. 3

| | 300 | 301 | 302 |
|---|---|---|---|
| | Expiration date | Target I/O command | Authorization target object |
| 310— | T11 | READ | OBJ1 |
| 311— | T21 | WRITE | OBJ2 |
| | ⋮ | ⋮ | ⋮ |

| | 300 | 301 | 302 | 303 | 304 |
|---|---|---|---|---|---|
| | Expiration date | Target I/O command | Authorization target object | Authorization time | Referable period/ storage period |
| 310— | T31 | WRITE | OBJ3 | T32 | T33 |
| 311— | T41 | READ | OBJ4 | T42 | T43 |
| | ⋮ | ⋮ | ⋮ | ⋮ | ⋮ |

F I G. 4

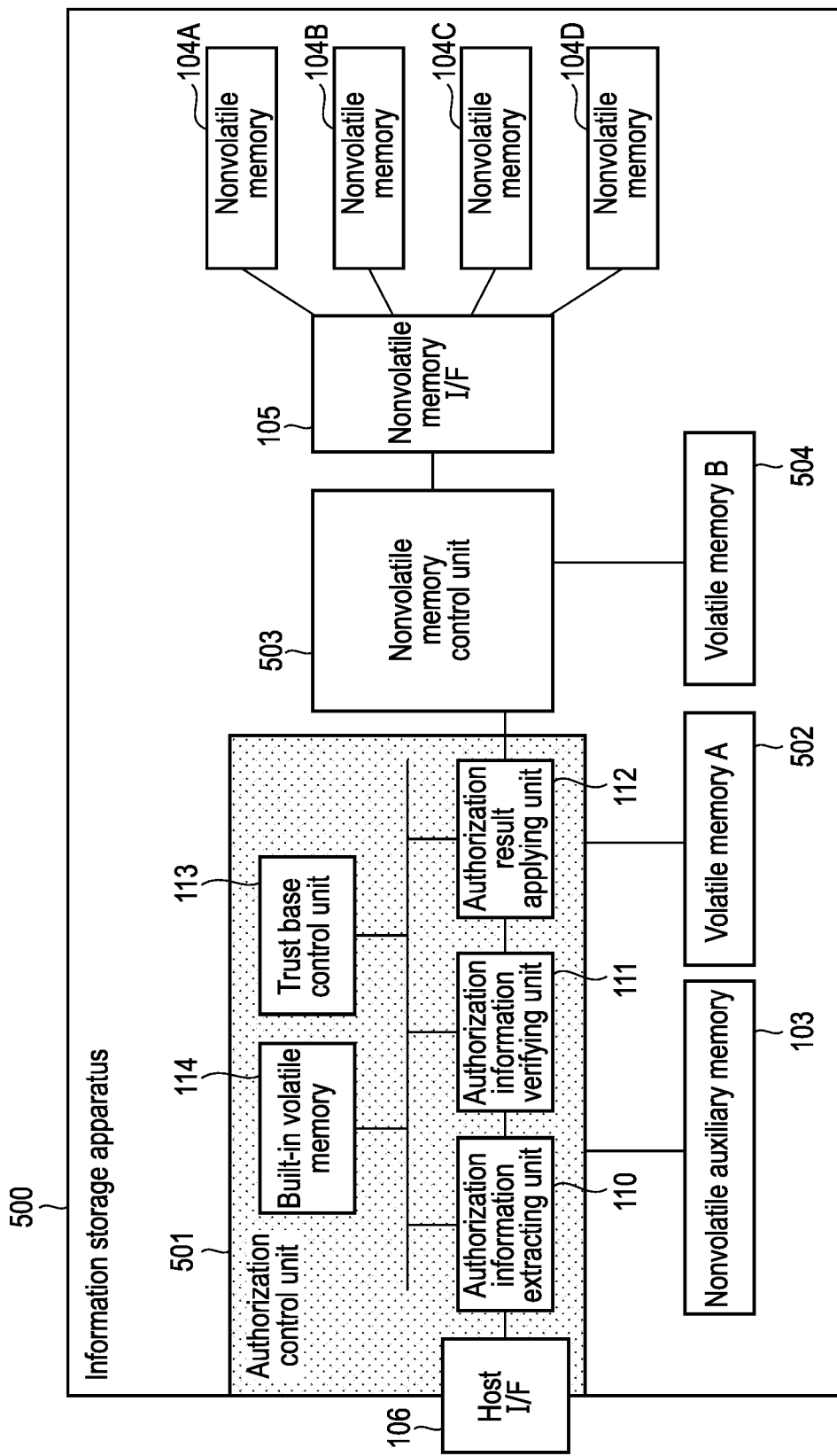
F I G. 5

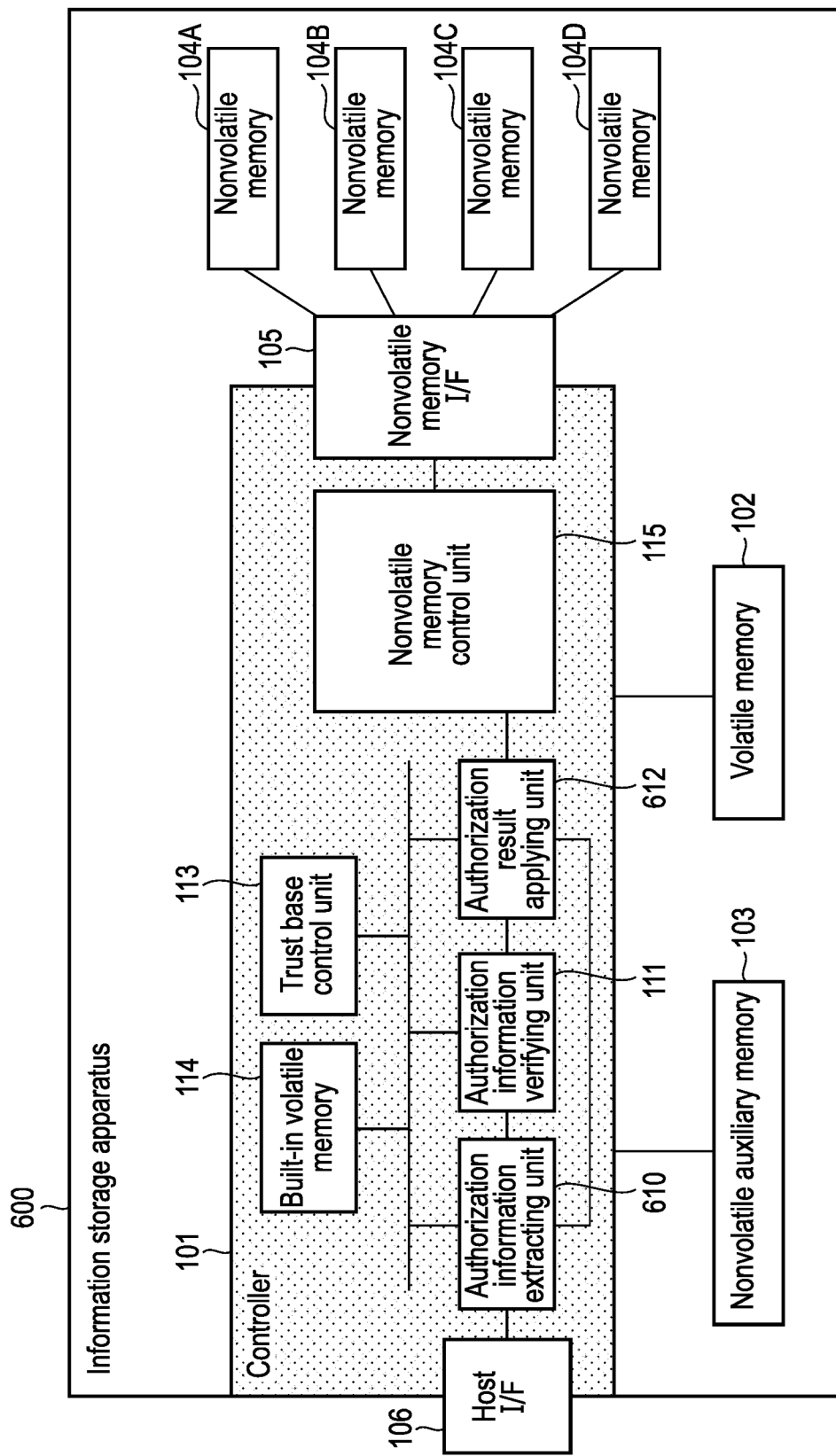
F I G. 6

| | 700 | 701 |
|---|---|---|
| | ID | Target I/O command, etc. |
| 710 | ID1 | READ/OBJ1 |
| 711 | ID2 | WRITE/OBJ2 |
| | ⋮ | ⋮ |

F I G. 7

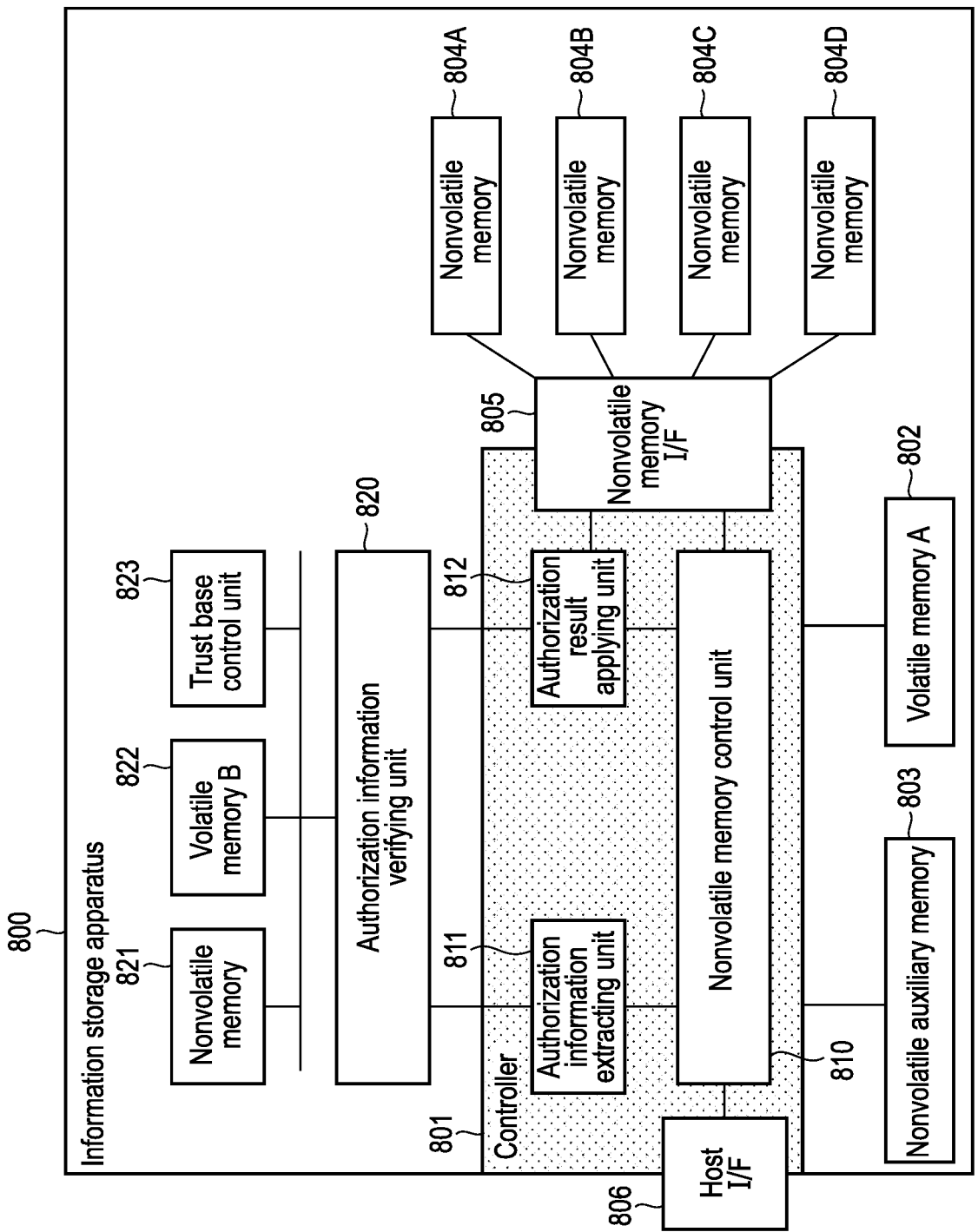
F I G. 8

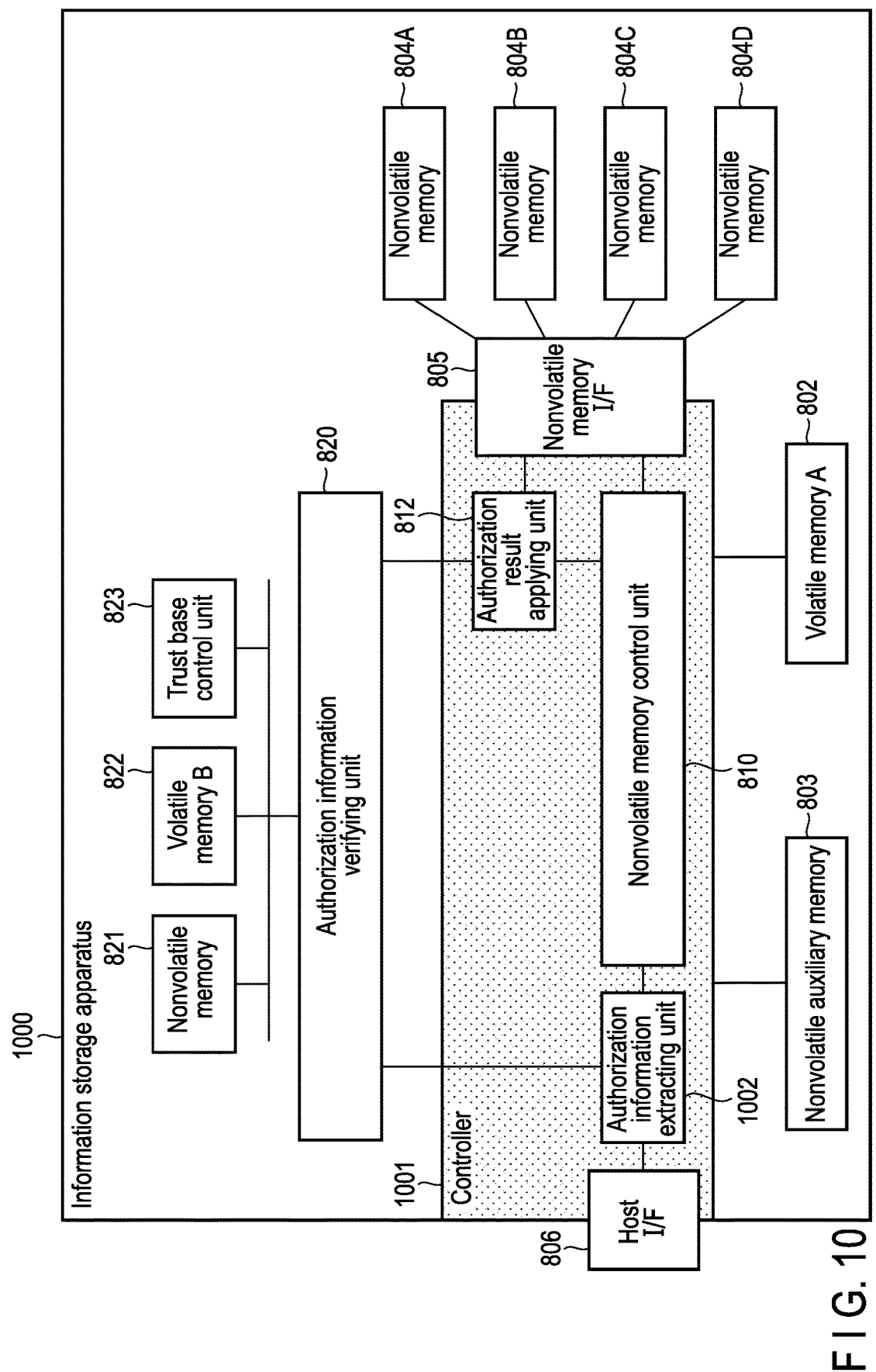
F I G. 10

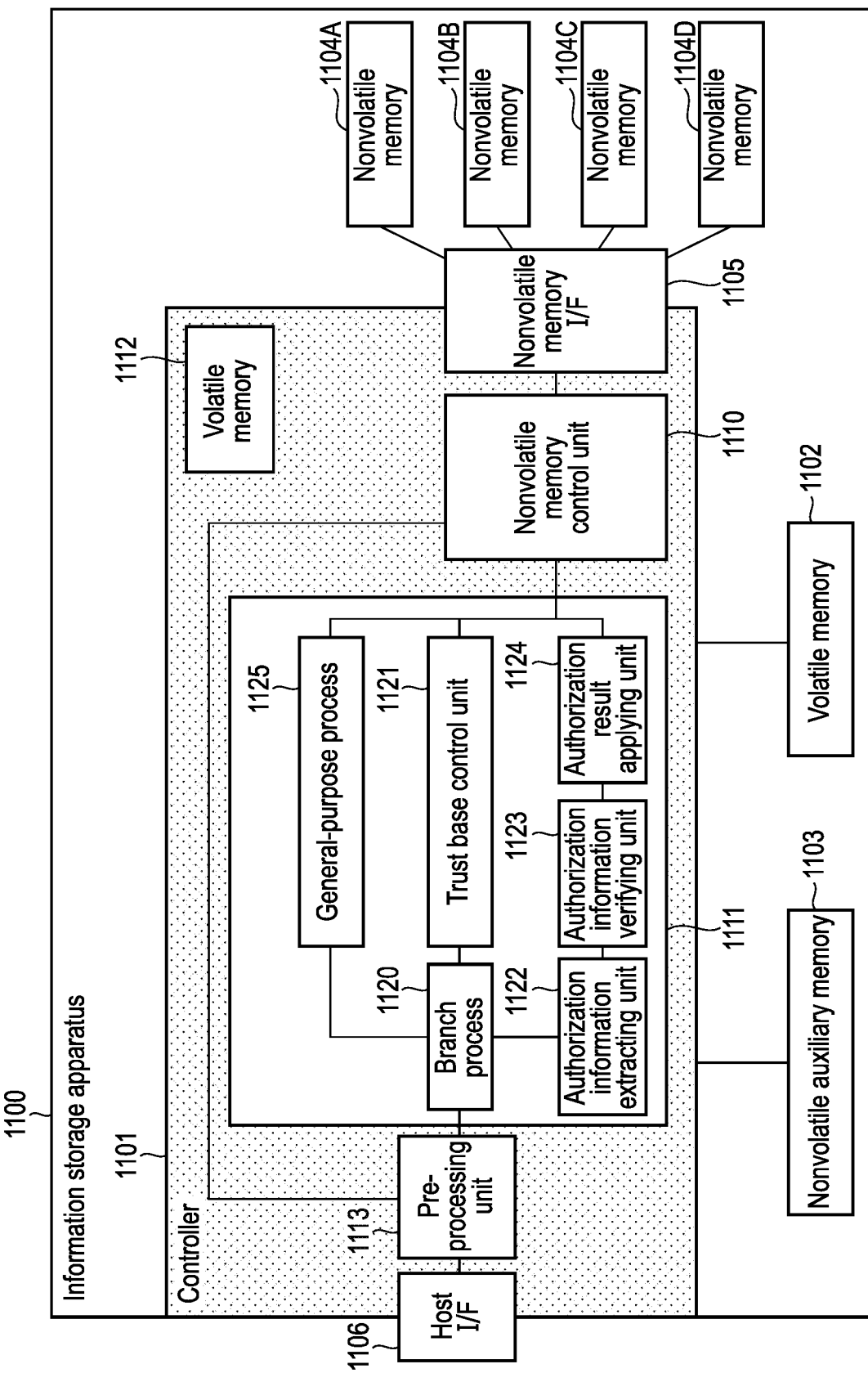
F I G. 11

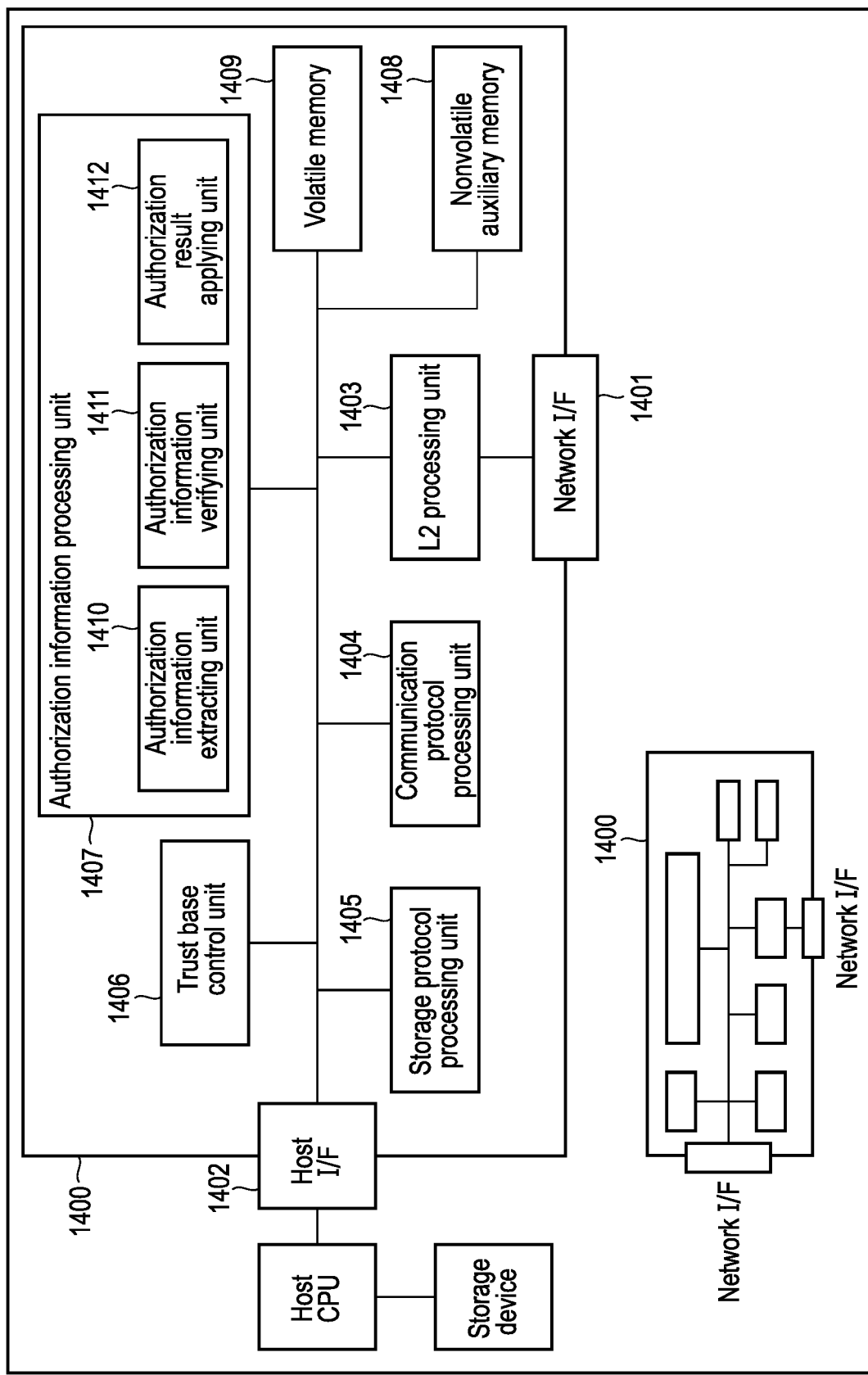
F I G. 14

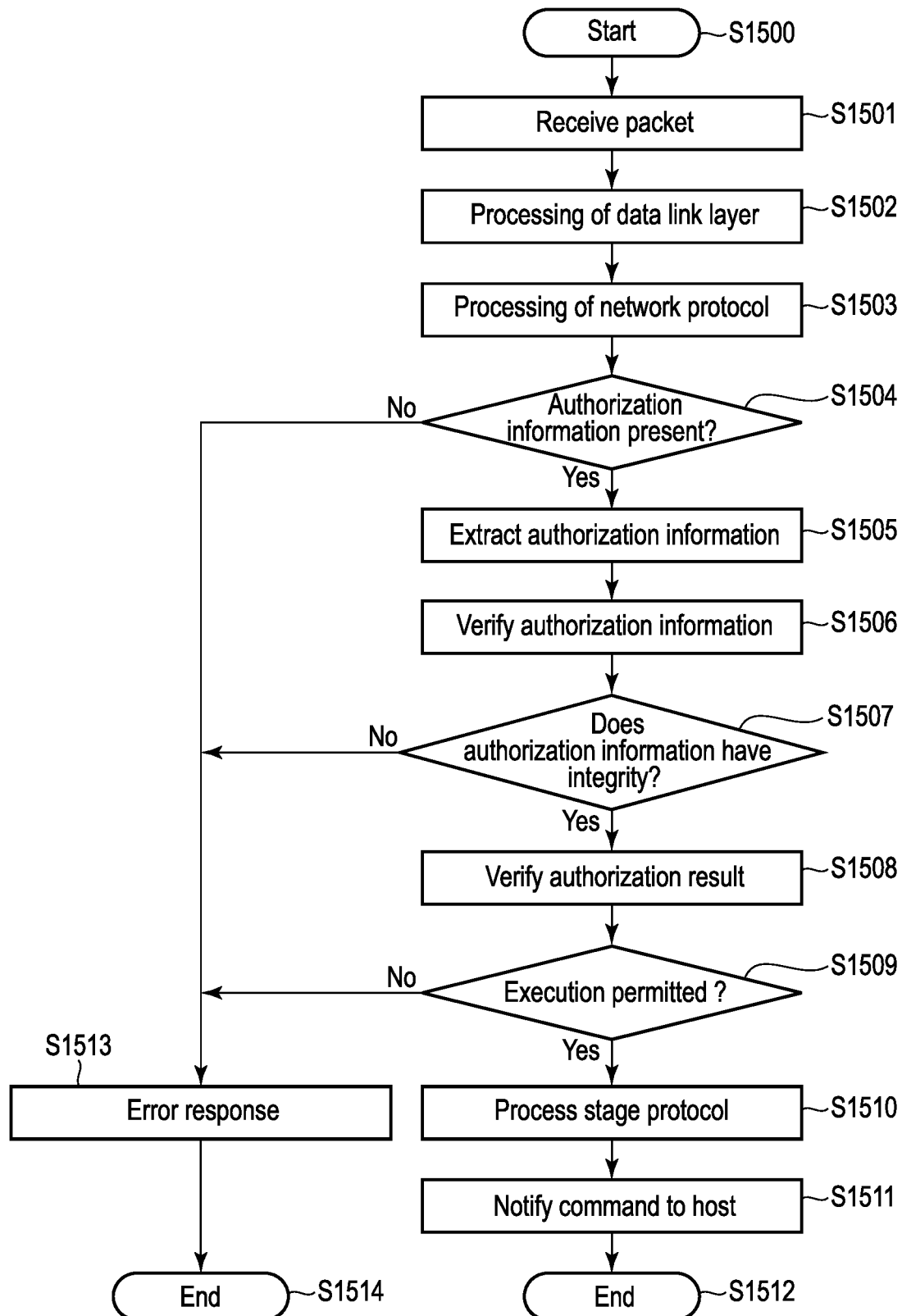
F I G. 15

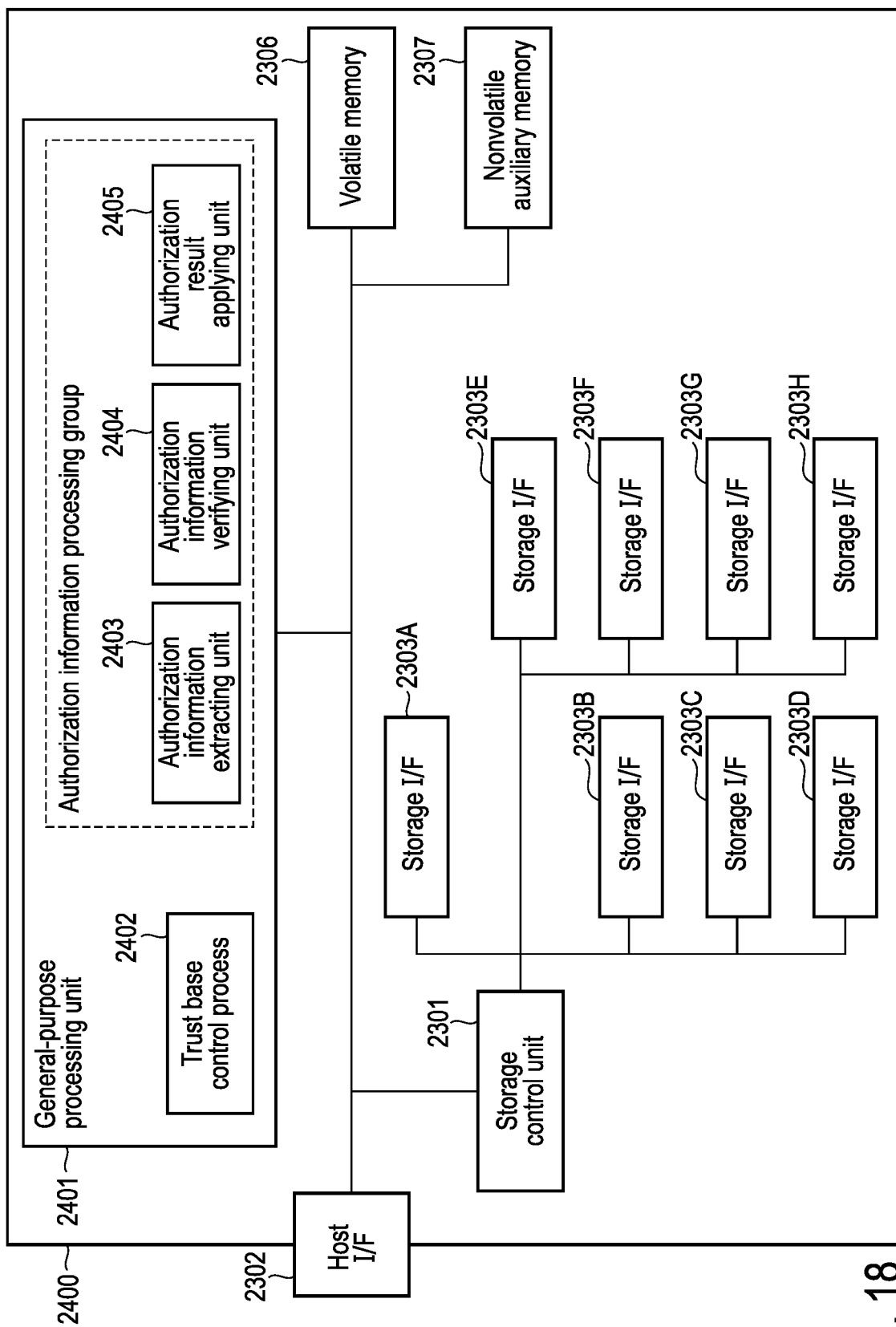
F I G. 18

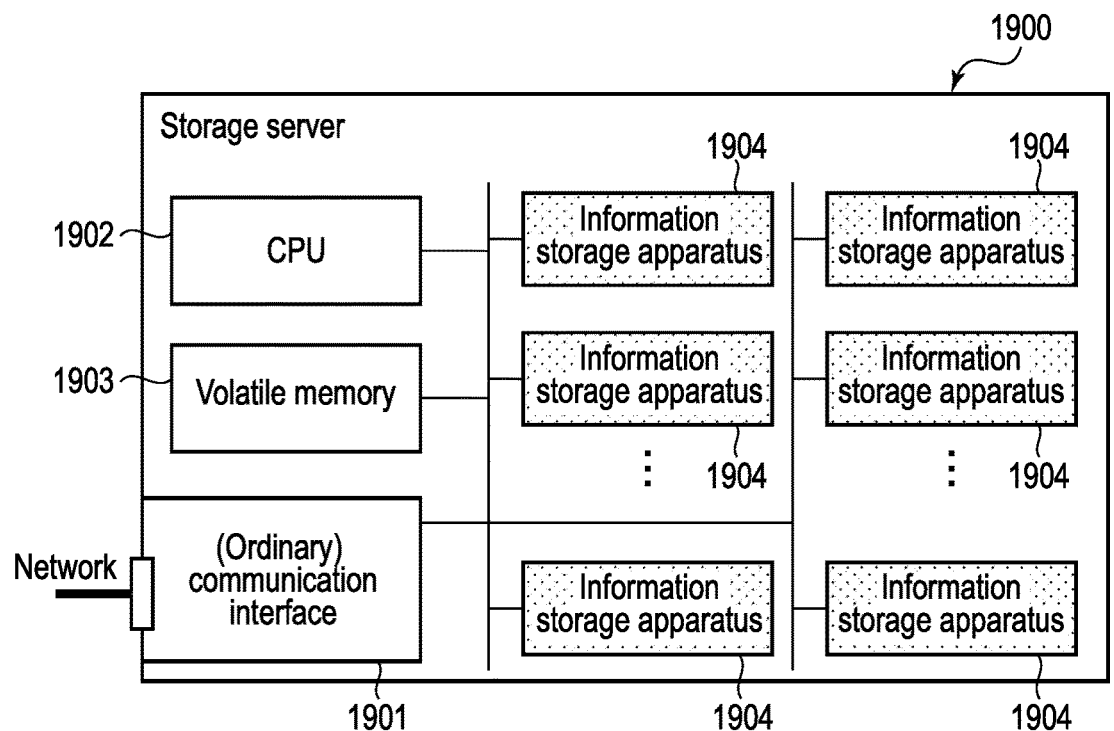
F I G. 19
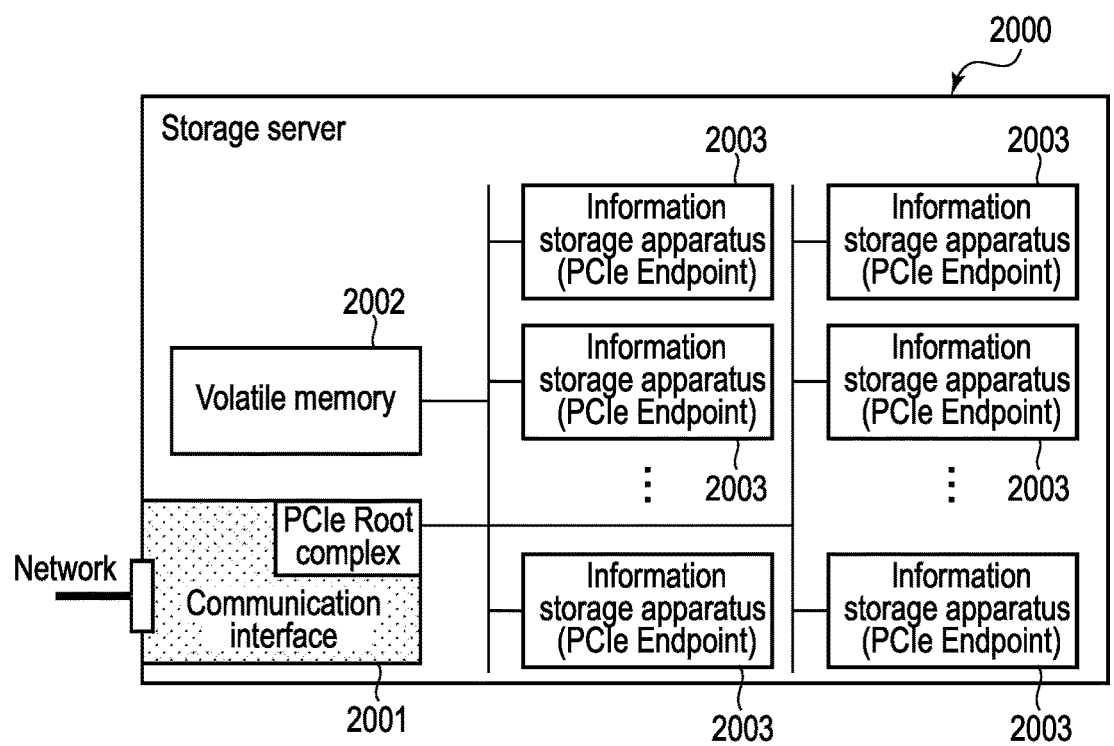
F I G. 20

/O COMMAND CONTROL APPARATUS AND STORAGE SYSTEM

CROSS-REFERENCE TO RELATED APPLICATIONS

This application is based upon and claims the benefit of priority from Japanese Patent Application No. 2021-035582, filed Mar. 5, 2021, the entire contents of which are incorporated herein by reference.

FIELD

Embodiments described herein relate generally to an I/O command control apparatus connectable to a storage device such as a hard disk drive (HDD) or a solid state drive (SSD), and a storage system.

BACKGROUND

Storage devices such as a hard disk drive (HDD) and a solid state drive (SSD) are configured to read and write information based on an I/O command from a host apparatus.

Recently, a technique of accessing a storage device via a network has also been used.

When a malicious program intrudes into software executed in a host apparatus such as a computer, invalid access to the storage device may lead to data destruction and data theft.

Therefore, it is required to realize a new technique capable of preventing the invalid access to the storage device.

BRIEF DESCRIPTION OF THE DRAWINGS

FIG. 1 is a block diagram illustrating a configuration example of an information storage apparatus according to a first embodiment.

FIG. 2 is a flowchart illustrating an operation sequence of the information storage apparatus according to the first embodiment.

FIG. 3 is a diagram illustrating a configuration example of an authorization information table managed by the information storage apparatus according to the first embodiment.

FIG. 4 is a diagram illustrating another configuration example of the authorization information table managed by the information storage apparatus according to the first embodiment.

FIG. 5 is a block diagram illustrating a configuration example of an information storage apparatus according to a second embodiment.

FIG. 6 is a block diagram illustrating a configuration example of an information storage apparatus according to a third embodiment.

FIG. 7 is a diagram illustrating an I/O command and an identifier corresponding to the I/O command stored in a memory in the information storage apparatus according to the third embodiment.

FIG. 8 is a block diagram illustrating a configuration example of an information storage apparatus according to a fourth embodiment.

FIG. 10 is a block diagram illustrating a configuration example of an information storage apparatus according to a fifth embodiment.

FIG. 11 is a block diagram illustrating a configuration example of an information storage apparatus according to a sixth embodiment.

FIG. 14 is a block diagram illustrating a configuration example of a communication interface according to an eighth embodiment.

FIG. 15 is a flowchart illustrating an operation sequence of the communication interface according to the eighth embodiment.

FIG. 18 is a block diagram illustrating another configuration example of the storage interface according to the tenth embodiment.

FIG. 19 is a block diagram illustrating a configuration example of a storage server according to an eleventh embodiment.

FIG. 20 is a block diagram illustrating another configuration example of the storage server according to the eleventh embodiment.

DETAILED DESCRIPTION

Figure 9:
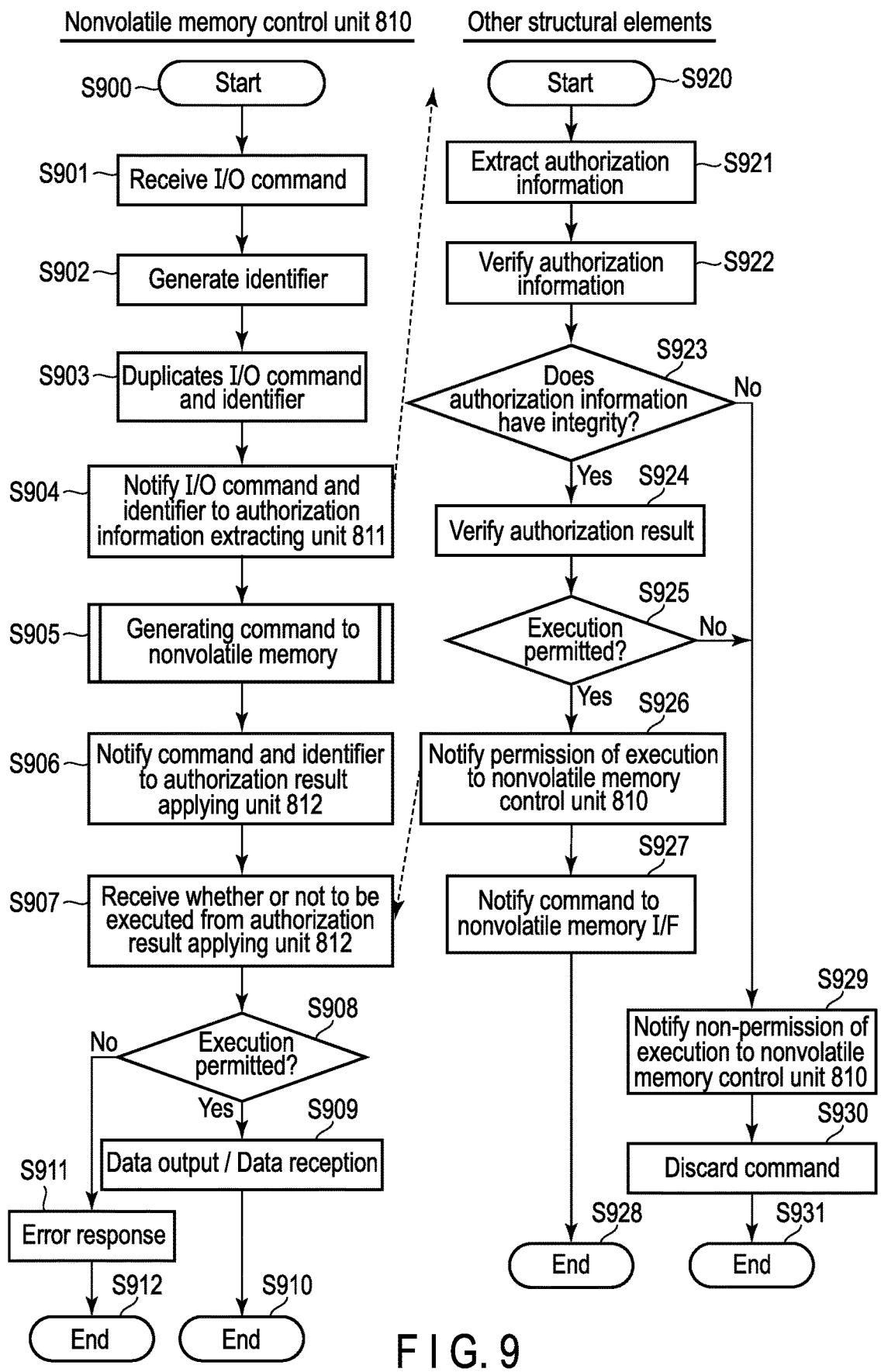
FIG. 9 is a flowchart illustrating an operation sequence of the information storage apparatus according to the fourth embodiment.

Various embodiments will be described hereinafter with reference to the accompanying drawings.

In general, according to one embodiment, an I/O command control apparatus configured to be connected to a storage device that reads and writes information based on an I/O command includes an I/O command interface, a control command interface, an authorization information receiving unit, an authorization information verifying unit, an authorization applying unit, a trust base control unit, and a storage control unit. The I/O command interface receives the I/O command from an external control entity. The control command interface transmits, to the storage device, a control command for controlling the storage device. The control command is generated based on the I/O command to the storage device. The authorization information receiving unit receives, via the I/O command interface, authorization information which indicates whether or not to permit execution of the I/O command. The authorization information is protected such that the authorization information cannot be tampered with by a transmission source of the I/O command. The authorization information verifying unit verifies whether the received authorization information is not tampered with and whether the authorization information is issued from a known authorization server. In a case where the received authorization information is not tampered with and is issued from the known authorization server, the authorization information verifying unit verifies whether or not the received authorization information permits the execution of the I/O command. The authorization applying unit permits or prohibits the execution of the I/O command or execution of the control command generated from the I/O command, based on an authorization result indicating whether or not the received authorization information permits the execution of the I/O command. The trust base control unit acquires trust information used by the authorization information verifying unit to verify whether the received authorization information is not tampered with and whether the received authorization information is issued from the known authorization server. The trust base control unit maintains and manages the acquired trust information. The storage control unit generates the control command based on the I/O command.

Hereinafter, an information storage apparatus, a communication interface, and a storage system according to some embodiments will be described with reference to the accompanying drawings.

First Embodiment

An information storage apparatus 100 according to a first embodiment is configured by adding, to a solid state drive (SSD) which stores information using a NAND flash memory, an authorization processing function which determines the propriety of execution of an I/O command and a trust base function which maintains trust information necessary for verifying the validity of the determination on the propriety. Hereinafter, a configuration in which the SSD including the authorization processing function and the trust base function is connected to a host computer will be described as an example. The configuration of the SSD and the connection form between the SSD and the host computer are not limited to this example.

FIG. 1 is a block diagram illustrating a configuration example of the information storage apparatus 100 according to the first embodiment. As illustrated in FIG. 1, the information storage apparatus 100 of this embodiment includes a controller unit 101, a volatile memory 102, a nonvolatile auxiliary memory 103, and nonvolatile memories 104A to 104D. The controller 101 is connected to the nonvolatile memories 104A to 104D via a nonvolatile memory interface (I/F) 105. The connection between the controller 101 and the nonvolatile memories 104A to 104D may be a state in which the controller 101 and the nonvolatile memories 104A to 104D are directly connected, or may be a state in which the controller 101 and the nonvolatile memories 104A to 104D are indirectly connected to each other with, for example, something else such as a transistor or a resistor interposed therebetween. The controller 101 is also connected to a host computer (not illustrated) via a host interface (I/F) 106.

The controller 101 is a control unit which controls the operation of the information storage apparatus 100. The controller 101 may be implemented as a dedicated circuit as a whole, may be implemented by combining a dedicated circuit and a general-purpose execution unit (such as a CPU), or may be implemented only by a general-purpose execution unit. In the general-purpose execution unit, each function described in this specification is executed by executing software implementing necessary functions.

The controller 101 includes an authorization information extracting unit 110 which extracts authorization information assigned to an I/O command received via the host I/F 106, an authorization information verifying unit 111 which verifies the extracted authorization information, an authorization result applying unit 112 which applies a verification result of the authorization information, a trust base control unit 113 which acquires, maintains, and manages trust information necessary for verification of the authorization information, a built-in volatile memory 114 which can hold a small amount of information inside the controller 101, and a nonvolatile memory control unit 115 which actually writes and reads information to and from the nonvolatile memories 104A to 104D via the nonvolatile memory I/F 105. The nonvolatile memory control unit 115 functions as a storage control unit, and generates a control command for controlling the nonvolatile memories 104A to 104D based on the I/O command.

In actual application, elements other than the described elements may be included in the information storage apparatus 100. However, the elements are not directly related to the present invention and thus are omitted. As described above, these internal components may be realized by a dedicated circuit or may be realized by a general-purpose execution unit and software operating thereon.

The nonvolatile memories 104A to 104D are nonvolatile memories for storing information, for example, NAND flash memories. Alternatively, the nonvolatile memories 104A to 104D may be, for example, a phase-change memory (PCM), a resistive random access memory (ReRAM), or a magneto-resistive random access memory (MRAM) or may store information in a magnetic body such as a hard disk drive (HDD). Here, four nonvolatile memories are used, but the number thereof is not limited to this example.

The volatile memory 102 is, for example, a dynamic random access memory (DRAM). The volatile memory 102 is used to store control information necessary for the operation of circuits and software in the controller 101. Further, the volatile memory 102 is a memory used to temporarily store information to be received via the host I/F 106 and written in the nonvolatile memories 104A to 104D and information to be read from the nonvolatile memories 104A to 104D.

The nonvolatile auxiliary memory 103 is a nonvolatile memory used for the purpose of, for example, storing initialization information necessary for the initial operation of the controller 101. This element is an additional element and may not necessarily be used. In a case where this element is not used, instead, the initialization information or the like can be stored in the nonvolatile memories 104A to 104D.

The nonvolatile memory I/F 105 is a storage interface which connects the controller 101 and storage devices such as the nonvolatile memories 104A to 104D. The nonvolatile memory I/F 105 functions as a control command interface for transmitting a control command for controlling the storage device to the storage device. For example, in a case where the nonvolatile memories 104A to 104D are NAND flash memories, the nonvolatile memory I/F 105 is implemented based on a specification of Toggle or ONFi. That is, the nonvolatile memory I/F 105 is used to transmit commands for controlling the nonvolatile memories 104A to 104D to the nonvolatile memories 104A to 104D, and is used to transmit and receive data between the controller 101 and the nonvolatile memories 104A to 104D.

The host I/F 106 is a local bus interface which connects the information storage apparatus 100 and the host computer (not illustrated). The host I/F 106 receives an I/O command from the host computer, and transmits and receives data between information storage apparatus 100 which transmits and receives data and the host computer in a protocol of a local bus. More specifically, the host I/F 106 adopts shape and electrical specifications such as SATA, PCI Express™ M.2, and PCI Express (PCIe™), and exchanges the control information and the information to be read/written with the host computer by using a control protocol such as SATA or NVM Express™ (NVMe™). Incidentally, the shape, electrical specification, and control protocol of the connector are not limited, and an appropriate connector may be selected according to the embodiment. The host I/F 106 functions as an I/O command interface which receives an I/O command from an external control entity such as a host computer.

(Operation Sequence)

FIG. 2 is a flowchart illustrating an operation sequence of the information storage apparatus 100. This operation sequence starts when the host I/F 106 receives an I/O command issued by the host computer (step S201). The authorization information extracting unit 110 of the information storage apparatus 100 verifies whether the authorization information is assigned to the I/O command received through host I/F 106 (steps S202 and S203). This authorization information indicates whether or not to permit the execution of the corresponding I/O command. Incidentally, a method of assigning the authorization information to the I/O command will be described later.

In a case where the authorization information is not assigned to the I/O command (No in step S203), an error is determined, and the processing ends without executing the I/O command (steps S211 and S212).

In a case where the authorization information is assigned to the I/O command, the processing is continued (Yes in step S203), and the authorization information extracting unit 110 extracts the authorization information from the I/O command (step S204). Next, the authorization information extracting unit 110 passes the received I/O command and the extracted authorization information to the authorization information verifying unit 111. In this case, the authorization information extracting unit 110 may generate an identifier (ID #2) capable of specifying the I/O command based on the I/O command so as to obtain the correspondence relationship between the authorization information and the I/O command, and then store the I/O command and the identifier (ID #2) in the built-in volatile memory 114 (or the volatile memory 102) in a state where the I/O command and the identifier (ID #2) are associated with each other.

The authorization information verifying unit 111 verifies whether the authorization information is not tampered with and whether the information is issued from a known authorization server (steps S205 and S206). Details of this verification method will be described separately.

As a result of verifying the authorization information, when it is found that the authorization information is invalid (No in step S206), an error is determined, and the processing ends without executing the I/O command (steps S211 and S212). As a result of verifying the authorization information, when it can be confirmed that the authorization information is valid, that is, in a case where the authorization information is not tampered with and is issued from a known authorization server (Yes in step S206), the authorization information verifying unit 111 verifies the content of the authorization information and obtains an authorization result (information indicating the propriety of execution) as the verification result of the authorization information (step S207). The verification process in step S207 is a process of verifying whether or not the authorization information permits the execution of the corresponding I/O command, and details of the verification process will be described later.

In step S207, the authorization information verifying unit 111 passes the I/O command and the verification result of the authorization information (the authorization result indicating the propriety of execution of the I/O command) to the authorization result applying unit 112. In this case, the authorization information verifying unit 111 may generate the identifier (ID #1) capable of specifying the I/O command corresponding to the authorization information based on the authorization information, and then store the verification result (authorization result) of the authorization information and the identifier (ID #1) in the built-in volatile memory 114 (or the volatile memory 102) in a state where the authorization result and the identifier (ID #1) are associated with each other.

Incidentally, the authorization information and the I/O command may be separately received via the host I/F 106. In this case, the authorization information may include an ID #1 capable of specifying the corresponding I/O command. In this case, the authorization information verifying unit 111 extracts the ID #1 from the authorization information, and then stores the verification result (authorization result) of the authorization information and the identifier (ID #1) in the built-in volatile memory 114 (or the volatile memory 102) in a state where the authorization result and the identifier (ID #1) are associated with each other.

As the result of the verification of the authorization information, when the authorization information does not permit the execution of the corresponding I/O command (No in step S208), that is, in a case where the authorization result indicates "non-executable", the authorization result applying unit 112 performs control so as not to execute this I/O command (or the control command generated from this I/O command). That is, when the authorization information does not permit the execution of the corresponding I/O command, an error is determined, and the processing ends without the execution of the I/O command (steps S211 and S212).

As the result of the verification of the authorization information, when the authorization information permits the execution of the corresponding I/O command (Yes in step S208), that is, when the authorization information permits the execution of the corresponding I/O command, the authorization result applying unit 112 passes the I/O command to the nonvolatile memory control unit 115 and performs control to execute the I/O command (or the control command generated from the I/O command) (step S209). In step S209, the nonvolatile memory control unit 115 which receives the I/O command generates a control command from the I/O command, and executes the generated control command.

In a case where the identifier (ID #2) is stored in the built-in volatile memory 114, and a pair of the verification result and the identifier (ID #1) is stored in the built-in volatile memory 114, the authorization result applying unit 112 may determine, for example, whether or not the identifier (ID #1) matching the identifier (ID #2) is stored in the built-in volatile memory 114.

When the identifier (ID #1) matching the identifier (ID #2) is stored in the built-in volatile memory 114, and the authorization result associated with the identifier (ID #1) indicates "executable", the authorization result applying unit 112 permits the execution of the I/O command (or the control command corresponding to the I/O command) specified by the identifier (ID #2) and performs control to execute the I/O command (or the control command).

When the identifier (ID #1) matching the identifier (ID #2) is stored in the built-in volatile memory 114, and the verification result associated with the identifier (ID #1) indicates "non-executable", the authorization result applying unit 112 prohibits the execution of the I/O command (or the control command corresponding to the I/O command) specified by the identifier (ID #2) and performs control so as not to execute the I/O command (or the control command).

In a case where the authorization information is not assigned to the received I/O command, the identifier (ID #1) matching the identifier (ID #2) is not stored in the built-in volatile memory 114. Therefore, even in a case where the identifier (ID #1) matching the identifier (ID #2) is not stored in the built-in volatile memory 114, the authorization result applying unit 112 prohibits the execution of the I/O command (or the control command corresponding to the I/O command) specified by the identifier (ID #2), and performs control so as not to execute the I/O command (or the control command).

Incidentally, although a process of returning a response to the I/O command to the host computer is not described here, a response to the I/O command permitted to be executed is processed in the same manner as the existing SSD. Further, although it is described that authorization information and the I/O command are passed between functional elements in a series of processes, information may be passed using an information exchange means (a register, some internal bus, or the like) between the functional elements, or may be passed via the built-in volatile memory 114. At that time, a structure may be employed in which a queue is created in the built-in volatile memory 114 and sequentially read from the information stored at the head, or a structure may be employed in which the functional element at the preceding stage stores information in the built-in volatile memory 114, and the location where the information is stored is transmitted to the functional element at the subsequent stage.

In a case where the authorization information and the I/O command are separately received via the host I/F 106, the authorization information extracting unit 110 may function as an authorization information receiving unit which receives both the authorization information and the I/O command, or the authorization information extracting unit 110 which receives the authorization information and another component may function as an authorization information receiving unit that receives both the authorization information and the I/O command. When receiving the I/O command via the host I/F 106, the authorization information receiving unit generates the identifier (ID #2) capable of specifying the I/O command based on the I/O command, and then stores the I/O command and the identifier (ID #2) in the built-in volatile memory 114 (or the volatile memory 102) in a state where the I/O command and the identifier (ID #2) are associated with each other.

In the information storage apparatus 100, the nonvolatile memory control unit 115 executes garbage collection, wear leveling, patrol, and the like as an internal operation for maintaining and managing the nonvolatile memories 104A to 104D. When executing the garbage collection, the wear leveling, or the patrol, the nonvolatile memory control unit 115 generates a control command used for executing the garbage collection, the wear leveling, or the patrol, and transmits the generated control command to the nonvolatile memories 104A to 104D. Therefore, the authorization result applying unit 112 excludes these control commands for internal operations from the application target command of the authorization process, and permits the execution of these control commands for internal operations regardless of the authorization information.

(Handling of Authorization Information in I/O Command)

Next, a relationship between the I/O command and the authorization information will be described. In implementation of the information storage apparatus 100, the authorization information is assigned to a reservation field, an extension header, meta information, and the like of the I/O command, and thus the authorization information is transmitted to the controller 101 together with the I/O command. For example, the authorization information may be assigned to a meta information field of NVMe, a TCP option of NVMe over TCP, an extension header of IPv6, or the like. In this case, the information storage apparatus 100 receives the I/O command to which the authorization information is assigned from the host computer as a control entity.

Only authorization information indicating whether or not to permit the execution of a certain I/O command can be transmitted to the information storage apparatus 100 by using a command different from the I/O command. In this case, the authorization information extracting unit 110 separately receives the I/O command and the authorization information, and thus it is desirable to use, as the authorization information, authorization information including the identifier for specifying the I/O command corresponding to the authorization information in order to correspond to the I/O command. Incidentally, even in a case where the authorization information is transmitted to the information storage apparatus 100 separately from the I/O command, a meta information field of NVMe, a TCP option of NVMe over TCP, an extension header of IPv6, and the like can be used as the command to transmit the authorization information.

(Verification of Authorization Information)

Next, verification of the authorization information will be described. When receiving the authorization information, the authorization information verifying unit 111 uses the trust information to confirm that the content of the authorization information is not tampered with. There are several methods for specific confirmation.

A first method is a method of using a hash value accompanying the authorization information. This hash value is generated by an authorization server which is a creation source of the authorization information and is assigned to the authorization information. The authorization information verifying unit 111 generates a hash value from the authorization information and compares the generated hash value with the hash value accompanying the authorization information. When these hash values do not match each other, an error is determined.

A second method is a method using an encrypted hash. In this method, the information storage apparatus 100 shares secret information (common key) with the authorization server which is a generation source of the authorization information in advance, and uses a hash value in consideration of the secret information. Since the authorization server having no secret information cannot calculate a valid encrypted hash value, the authorization server has an effect of authenticating the authorization server.

A third method is a method using a digital certificate and an electric signature. The authorization information verifying unit 111 receives a digital certificate indicating its origin from the authorization server. The authorization server generates an electric signature using a secret key corresponding to a public key which is included in the digital certificate and assigns the generated electric signature to the authorization information. In this case, an electric signature may be created using a secret key for a hash value calculated from the authorization information and assigned to the authorization information. When receiving the authorization information including the electric signature, the authorization information verifying unit 111 processes the electric signature by using the public key included in the digital certificate and confirms the generation source of the authorization information. In this way, by using public key encryption, it can be confirmed that the authorization server is authenticated, and the authorization information is not tampered with.

As described above, for example, a tamper protection technique such as encryption or encrypted hash is applied to the authorization information. Accordingly, the authorization information is protected such that the authorization information cannot be tampered with by a transmission source of the I/O command such as the host computer. Then, when the authorization information is received via the host I/F 106, the authorization information verifying unit 111 uses the trust information to verify the integrity of the received authorization information, that is, whether the received authorization information is not tampered with and whether the received authorization information is issued from a known authorization server. Then, in a case where the integrity of the received authorization information is confirmed, the authorization information verifying unit 111 verifies whether or not the authorization information permits the execution of the I/O command. The authorization result applying unit 112 permits or prohibits the execution of the I/O command, based on the authorization result indicating whether or not the authorization information permits the execution of the I/O command.

As a result, it is possible to execute an authorization process of verifying the authorization information inside the information storage apparatus 100. Therefore, even in a case where malware intrudes into software of the host computer, it is possible to prevent the data stored in the information storage apparatus 100 from being destructed or data from being thieved.

(Acquisition of Information Necessary for Verification of Authorization Information)

Information such as secret information (the above-described second method) and a digital certificate (the above-described third method) used by the authorization information verifying unit 111 to verify the authorization information is stored in the built-in volatile memory 114 or the nonvolatile auxiliary memory 103 by the trust base control unit 113. Any one of the built-in volatile memory 114 and the nonvolatile auxiliary memory 103 may be used for storing the information. There are plural methods for the trust base control unit 113 to acquire the above-described secret information and digital certificate.

A first method is a method of storing one or more pieces of information in advance at the time of factory shipment of the information storage apparatus 100 (since the information is stored in advance, the information is inevitably stored in the nonvolatile auxiliary memory 103). Verification of the authorization information is performed directly using this information stored in advance.

A second method is an extension of the first method. A means for exchanging information via the host computer with the information stored in advance as a starting point is established with a trusted partner, and new secret information and a digital certificate are obtained via the means. This process may be executed during an initialization operation of the host computer, or may be configured to be started when a special operation (for example, activating a specific application in a specific environment, pressing a specific button prepared in the information storage apparatus 100, or the like) is executed on the host computer. Examples of the information exchange means include one that is completed only between the host computer and the information storage apparatus 100 (for example, a protocol obtained by extending NVMe or PCIe or a command group (a command group using SMBus, I2C, or the like) executed on a simple local bus), and one that interacts with the outside via various interfaces included in the host computer (for example, directly communicates with an external authorization server that generates authorization information via a network interface included in the host or receives input of information via a keyboard, a mouse, or the like included in the host).

A third method is a method in which the information storage apparatus 100 includes another interface (which may be dedicated to reception) different from host I/F 106, and receives information through the interface. The interface may be enabled only when some condition is satisfied. As the condition, for example, it is considered that when a specific application is executed on the host computer, and a special command is received via the host I/F 106, a button prepared in the information storage apparatus 100 is pressed. The trust base control unit 113 detects that these conditions are satisfied, and then executes a procedure of receiving necessary information via this interface and performs a process of storing the information in the built-in volatile memory 114 or the nonvolatile auxiliary memory 103.

A fourth method is a method of downloading secret information and a digital certificate from the host computer together with firmware at the time of initialization of the information storage apparatus 100. When the firmware is received via the host I/F 106, the authorization information extracting unit 110 separates the firmware from the secret information and the digital certificate, passes the firmware to the nonvolatile memory control unit 115, and passes the secret information and the digital certificate to the trust base control unit 113.

By these methods, during the initialization of information storage apparatus 100 or during the operation of the information storage apparatus 100, the trust base control unit 113 acquires at least one of (i) the digital certificate including a public key and (ii) a common key, as trust information via the host I/F 106. Then, the trust base control unit 113 newly stores the acquired trust information in the built-in volatile memory 114 or the nonvolatile auxiliary memory 103, or updates the trust information already stored in the built-in volatile memory 114 or the nonvolatile auxiliary memory 103 with the acquired trust information.

(Confirmation of Authorization Information)

After the authorization information verifying unit 111 can confirm the integrity of the authorization information, that is, after it can be confirmed that the authorization information is not tampered with and that the authorization information is issued from a known authorization server, the authorization information verifying unit 111 confirms the information included in the authorization information. The target information includes an authorization result (the propriety of execution of the corresponding I/O command), an authorization time, the valid period of the authorization information (here, a period is specified, but an authorization deadline based on date and time may be specified), the referable deadline (in the case of reading)/the storage deadline (in the case of writing) of the information to be authorized, and the like (the referable period/storage period of the information may not be optional). The result of the authorization is information indicating permission/non-permission. The authorization time is information indicating a time when the authorization server performs authorization determination or a time when the authorization server generates the authorization information. The valid period of the authorization information is information indicating a time when the authorization information including this information is determined to be valid, and the corresponding I/O command group does not need to be authorized again within a specified period. The referable period/storage period is information indicating a time during which the read information can be referred to by a read destination (for example, a host) or a time during which the read information is stored in information storage apparatus 100.

The authorization information verifying unit 111 specifies each piece of the above-described information from the authorization information. Then, the authorization information verifying unit 111 stores the specified information in the built-in volatile memory 114 or the volatile memory 102. This information is held as, for example, authorization information table as illustrated in FIG. 3. Here, each piece of authorization information is sorted in order of expiration date. However, each piece of authorization information may be sorted in order of reception or, in a case where the I/O commands have identifiers having sequentiality, may be sorted in that order of the I/O commands. The table of FIG. 3 includes an expiration date (column 300), a control I/O command (column 301), an authorization target object (column 302), an authorization time (column 303), and a referable period/storage period (column 304), but this configuration is an example.

The expiration date (column 300) is a deadline calculated based on the authorization time included in the authorization information and the valid period of the authorization information. Further, the authorization information may be notified together with information indicating an authorization deadline, and in this case, the information indicating the authorization deadline may be stored as the expiration date as it is in the authorization information table (column 300).

The target I/O command (column 301) is information indicating the type of an I/O command such as a READ/WRITE command. Here, the READ/WRITE command is described as an example of the target I/O command, but examples of the target I/O command may include a management command used for reset, firmware download, update of information regarding security, or the like.

The authorization target object (column 302) is information indicating a target to be accessed by the target I/O command (column 301). Although the description is given about an object here, a target to be pointed may change according to the format of the information stored in the information storage apparatus 100. When the information storage apparatus 100 is an object storage which stores unstructured data, the authorization target object indicates an object or an object group. When the information storage apparatus 100 is a block storage device, the authorization target object indicates a specific block or a continuous block group, or at least one block group specified using information managed by an upper file system. Incidentally, a method of specifying the block group from the information managed by the file system and including the block group in the authorization information is not specified here.

The authorization time (column 303) is information indicating the authorization time included in the authorization information. Similarly, the referable period/storage period (column 304) is information indicating the referable period/storage period included in the authorization information. However, similarly to the expiration date (column 300), the referable period/storage period may be a deadline specified by date and time instead of a period.

In FIG. 3, two pieces of authorization information are held in row 310 and row 311, but a new entry is added to the authorization information table each time the authorization information verifying unit 111 verifies new authorization information. Further, when the authorization information verifying unit 111 adds new authorization information, confirms the authorization information table, or executes a periodic entry deletion process, an entry which reaches the expiration date is deleted from the authorization information table.

In FIG. 3, an example is described in which a series of authorization information is held in one authorization information table. However, the series of authorization information may be divided and stored in a plurality of tables. For example, some authorization information used most recently may be stored in the built-in volatile memory 114, and other authorization information (or all authorization information including the authorization information held in the built-in volatile memory 114) may be stored in the volatile memory 102. At this time, the two tables may have the same configuration or different configurations. For example, the information stored in the built-in volatile memory 114 may be minimized, and only an expiration date, a target control command, and an authorization target object may be stored in a table in the built-in volatile memory 114 (FIG. 4). Various cache control algorithms such as least recently used (LRU) and least frequently used (LFU) may be applied to a method of determining whether or not to store information in the built-in volatile memory 114 or a method of selecting the authorization information to be erased from the built-in volatile memory 114. The control of cache algorithm may be implemented inside the authorization information verifying unit 111.

(Processing of Error)

In a series of sequences, process in a case where an error occurs is supplemented. In each case (S203—NO, S206—NO, and S208—NO) where an error occurs, the type of error to be returned to the host computer may depend on implementation. For example, notification may be sent as an error indicating an invalid I/O command, or notification may be sent as a simple command error. However, it is necessary to pay attention since an attacker may obtain some information when notifying the outside that there is an error in the authorization information or that the I/O command is not authorized.

As described above, in the first embodiment, the controller 101 directly connected to the nonvolatile memories 104A to 104D controlled as storage devices by the nonvolatile memory control unit 115 functions as an I/O command control apparatus configured to permit or prohibit the execution of the I/O command (or control command) based on the authorization information received via the host I/F 106.

(Conclusion of First Embodiment)

The above is the first embodiment. The information storage apparatus 100 has a function of receiving the I/O command to which the authorization information is assigned and verifying the integrity of the authorization information and a function of acquiring, maintaining, and managing the information necessary for verifying the integrity, and the information storage apparatus 100 can determine the propriety of execution of the I/O command without depending on the control on the host side. Accordingly, even in a case where the software on the host is intruded by a malicious program, it is possible to maintain the operation of determining the propriety of execution of the I/O command based on the valid authorization information. Incidentally, the information storage apparatus 100 may receive the authorization information indicating whether or not to permit the execution of the I/O command separately from the I/O command.

Second Embodiment (Functional Block Diagram)

Next, a second embodiment obtained by modifying the first embodiment will be described. FIG. 5 is a block diagram illustrating a configuration example of the second embodiment. In the drawing, the same functions and configurations as those in FIG. 1 are denoted by the same reference numerals as those in FIG. 1. The largest change in the drawing is that the controller 101 in FIG. 1 is separated into an authorization control unit 501 and a nonvolatile memory control unit 503. In the nonvolatile memory control unit 503, a new component is added between the nonvolatile memory control unit 503 and a host I/F 106. Accordingly, in an information storage apparatus 500 according to the second embodiment, it is possible to add an I/O command executability determination function based on the authorization information without making a large design change to the existing information storage apparatus.

Incidentally, In FIG. 5, in accordance with the separation of the controller 101, the volatile memory 102 is also separated into a volatile memory (A) 502 and a volatile memory (B) 504. However, this separation is not necessarily essential. In a case where the volatile memory is arranged at a position easily available from the authorization control unit 501 and the nonvolatile memory control unit 503 and can be appropriately used, the volatile memory 102 may not be separated into the volatile memory (A) 502 and the volatile memory (B) 504. Further, in a case where the authorization control unit 501 can be implemented using only the built-in volatile memory 114 as an operation memory, the volatile memory (A) 502 is unnecessary.

(Operation Sequence)

Since a series of operation sequences of the second embodiment is the same as that of the first embodiment, the description thereof is omitted.

(Conclusion of Second Embodiment)

By separately implementing the authorization control unit 501 and the nonvolatile memory control unit 503 in this manner, it is possible to add a control function based on the authorization information similar to that of the first embodiment without making a large change to the existing information storage apparatus.

Third Embodiment (Functional Block Diagram and Operation Sequence)

Next, a third embodiment obtained by further modifying the first embodiment will be described. FIG. 6 is a block diagram illustrating a configuration example of an information storage apparatus 600 according to the third embodiment. The third embodiment is different in that a path directly connecting an authorization information extracting unit 610 and an authorization result applying unit 612 is provided. In the first embodiment, the process is continuously performed using the internal bus of the controller 101 or the like. However, in the third embodiment, the authorization information extracted by the authorization information extracting unit 610 is passed to an authorization information verifying unit 111, and the information included in the I/O command other than the authorization information is directly passed to the authorization result applying unit 612.

In the third embodiment, the authorization information verifying unit 111 may be configured to be able to simultaneously verify a plurality of pieces of authorization information. In general, a hash/encryption algorithm required for an authorization verification process (also simply referred to as an authorization process) requires a lot of calculations, and thus the time required is longer than that for other processes. The performance of the information storage apparatus 600 can be expected to be improved by executing authorization processes for the plurality of pieces of authorization information in parallel. In the authorization information verifying unit 111 capable of simultaneously verifying the plurality of pieces of authorization information, a verification process is executed, for example, in the order in which the authorization information is extracted.

The authorization information extracting unit 610 passes, to the authorization information verifying unit 111, the authorization information which is assigned with an appropriate identifier such that a correspondence relationship between the authorization information and the control command can be obtained by the authorization result applying unit 612, and passes, to the authorization result applying unit 612, an I/O command which is assigned with an appropriate identifier. The authorization information verifying unit 111 sequentially processes the authorization information and passes a combination of the identifier and the information indicating the propriety of execution to the authorization result applying unit 612.

When the authorization information extracting unit 610 notifies the authorization result applying unit 612 of the I/O command and the like, the I/O command and the like may be temporarily stored in the built-in volatile memory 114 together with the identifier (FIG. 7), and the authorization result applying unit 612 may refer to the information as appropriate.

In the table of FIG. 7, column 700 for storing an identifier and column 701 for storing information indicating a target I/O command (or both the target I/O command and the target object) are defined. ID1 stored in column 700 of row 710 of this table is an identifier for specifying the I/O command (here, a READ command for a target object OBJ1) stored in column 701 of row 710. ID2 stored in column 700 of row 711 of this table is an identifier for specifying the I/O command (Here, a WRITE command for a target object OBJ2) stored in column 701 of row 711.

For example, when the authorization result (information indicating the propriety of execution) and the corresponding identifier (corresponding to ID1, ID2, and so on in FIG. 7) are notified from the authorization information verifying unit 111, the authorization result applying unit 612 reads the I/O command associated with the notified identifier from the built-in volatile memory 114, and applies the authorization result to the read I/O command. For example, in a case where the authorization result and ID1 of FIG. 7 are notified from the authorization information verifying unit 111, the authorization result applying unit 612 reads the READ command for the target object OBJ1 from the built-in volatile memory 114 and applies the authorization result to the READ command.

Incidentally, the authorization information verifying unit 111 may store the authorization result (information indicating the propriety of execution) and the identifier for specifying the I/O command corresponding to the authorization result in the built-in volatile memory 114 in a state where the authorization result and the identifier are associated with each other. In this case, for example, in the case of applying the authorization result to the READ command associated with ID1, the authorization result applying unit 612 reads the authorization result associated with the identifier matching ID1 from the built-in volatile memory 114, and applies the read authorization result to the READ command associated with ID1.

The authorization result applying unit 612 may include a small amount of memory capable of configuring a queue. When the authorization result and the identifier are notified from the authorization information verifying unit 111, the authorization result applying unit 612 may complete association between the authorization result and the I/O command inside the authorization result applying unit 612 by acquiring the I/O command associated with the notified identifier from the queue.

In any case, the authorization result applying unit 612 executes the I/O command while maintaining the correspondence relationship between the result of the corresponding authorization information and the I/O command notified from the authorization information extracting unit 610.

(Conclusion of Third Embodiment)

In this way, in a case where the authorization information verifying unit 111 can process the plurality of pieces of authorization information simultaneously, the corresponding authorization result can be applied to each I/O command without depending on the verification completion order of the authorization information. As a result, in addition to the effects of the first embodiment, the performance indexes such as I/O throughput and I/O latency of the information storage apparatus 600 can be expected to be improved.

Here, the third embodiment has been described as a modification to the first embodiment. However, the configuration of the information storage apparatus 600 of the third embodiment which executes the authorization process of the plurality of authorization information in parallel can be realized as a modification to the second embodiment.

Fourth Embodiment (Functional Block Diagram)

Next, a fourth embodiment will be described. In each of the embodiments described above, the authorization process for verifying the authorization information is performed at the preceding stage of the nonvolatile memory control unit. On the other hand, in the fourth embodiment, an authorization process for verifying authorization information and a command process for processing an I/O command can be executed in parallel.

FIG. 8 is a block diagram illustrating a configuration example of an information storage apparatus 800 according to the fourth embodiment.

The information storage apparatus 800 according to the fourth embodiment includes a controller 801, a volatile memory (A) 802, a nonvolatile auxiliary memory 803, nonvolatile memories 804A to 804D, an authorization information verifying unit 820, a nonvolatile memory 821, a volatile memory (B) 822, and a trust base control unit 823. The controller 801 is connected to a host computer via a host I/F 806, and is connected to the nonvolatile memories 804A to 804D via a nonvolatile memory I/F 805.

The controller 801 in the fourth embodiment is different from the controller 101 in the first embodiment mainly in that the authorization information verifying unit 820 is externally attached, and the nonvolatile memory control unit 810 is directly connected to the host I/F 806. Further, the nonvolatile memory 821, the volatile memory (B) 822, and the trust base control unit 823 used by the externally attached authorization information verifying unit 820 are connected to the authorization information verifying unit 820. The volatile memory (A) 802 and the nonvolatile auxiliary memory 803 used by the controller 801 are connected to the controller 801 as in the first embodiment. Incidentally, the volatile memory (A) 802 is used as a working memory or the like for the controller 801 to operate, and the nonvolatile auxiliary memory 803 is used to hold an initialization parameter or the like for the controller 801 to operate. This object is the same as the other embodiments.

The nonvolatile memory control unit 810 according to the fourth embodiment newly has a function of duplicating an I/O command including authorization information received via the host I/F 806 and notifying the authorization information extracting unit 811 of the duplicated I/O command together with an appropriate identifier. This function is substantially the same as the function of the authorization information extracting unit 610 in the third embodiment (the authorization information and the I/O command are separated in the authorization information extracting unit 610, but in the authorization information extracting unit 811, the I/O command including the authorization information is simply duplicated without separating the authorization information and the I/O command). Further, the nonvolatile memory control unit 810 has a function of generating a control command for controlling the nonvolatile memories 804A to 804D based on the I/O command, and notifying an authorization result applying unit 812 of the generated control command together with the same identifier as the identifier notified to the authorization information extracting unit 610.

The authorization information extracting unit 811 which receives the control command including the authorization information from the nonvolatile memory control unit 810 has a function of extracting the authorization information similarly to the authorization information extracting unit in the first embodiment, and notifying the authorization information verifying unit 820 of the authorization information together with the identifier. The authorization information verifying unit 820 has a function of verifying the authorization information as in the first embodiment, and a function of storing the authorization result and the identifier in the volatile memory (B) 822 and notifying the authorization result applying unit 812 of the control unit 801 of the authorization result and the identifier.

The authorization result applying unit 812 has a function of controlling whether or not to notify the nonvolatile memories 804A to 804D of the control command via the nonvolatile memory I/F 805 based on the authorization result and the identifier notified from the authorization information verifying unit 820 and the control command and the identifier output from the nonvolatile memory control unit 810. Herein, in a case where the nonvolatile memories 804A to 804D are not notified of the control command (=the execution of the control command is not authorized), the authorization result applying unit 812 also has a function of notifying the nonvolatile memory control unit 810 of the fact.

(Operation Sequence)

FIG. 9 illustrates an operation sequence in the fourth embodiment. In order to clarify the features of the fourth embodiment, this drawing illustrates process executed by the nonvolatile memory control unit 810 on the left side (steps S900 to S912), and process executed by other components (the authorization information extracting unit 811, the authorization information verifying unit 820, and the authorization result applying unit 812) on the right side (steps S920 to S931).

The operation of the fourth embodiment starts when the nonvolatile memory control unit 810 receives an I/O command via the host I/F 806 (steps S900 and S901). The nonvolatile memory control unit 810 generates an identifier for specifying the I/O command based on the I/O command received in step S901 (step S902), duplicates the I/O command and the identifier (step S903), and passes the duplicated I/O command and identifier to the authorization information extracting unit 811 (step S904). From this point, the nonvolatile memory control unit 810 and other components perform different operations in parallel.

The nonvolatile memory control unit 810 performs process necessary for executing the received I/O command. For example, a process of specifying a nonvolatile memory to be an access destination and generating a control command to be transmitted to the specified nonvolatile memory is performed (step S905). The authorization result applying unit 812 is notified of the generated control command together with the identifier generated in step S902 (step S906). On the other hand, another component performs a series of verification processes as described in the first to third embodiments on the authorization information included in the duplicated I/O command. The authorization result applying unit 812 is notified of the authorization result together with an identifier for specifying the corresponding I/O command (steps S920 to S924). In the series of processes in steps S920 to S924, the volatile memory (B) 822 and the trust base control unit 823 are used similarly to the first to third embodiments.

When the execution of the I/O command is permitted (Yes in step S925), the authorization result applying unit 812 notifies the nonvolatile memory control unit 810 that the execution of the control command notified from the nonvolatile memory control unit 810 is permitted (S926). Then, the authorization result applying unit 812 notifies a predetermined nonvolatile memory among the nonvolatile memories 804A to 804D of the control command notified from the nonvolatile memory control unit 810 via the nonvolatile memory I/F 805, and performs reading and writing of data and the like (step S927). When the execution of the I/O command is not permitted (No in step S925), the authorization result applying unit 812 notifies the nonvolatile memory control unit 810 that the execution of the control command notified from the nonvolatile memory control unit 810 is not permitted (S929). Then, the authorization result applying unit 812 discards the control command notified from the nonvolatile memory control unit 810 so that the control command is not executed for the nonvolatile memories 804A to D (step S930).

In a case where the execution is permitted (Yes in step S908), the nonvolatile memory control unit 810 which receives the notification (permission or non-permission) of the authorization result from the authorization result applying unit 812 specifies data to be processed from the identifier corresponding to the control command permitted to be executed, outputs the specified data to the nonvolatile memory of the access destination or receives the data from the nonvolatile memory of the access destination (step S909), and ends the processing (step S910). In a case where the execution is not permitted (No in step S908), the nonvolatile memory control unit 810 returns an error response to the host computer (step S911), and ends the processing (step S912). The above is the operation sequence of the fourth embodiment.

(Conclusion of Fourth Embodiment)

In the fourth embodiment, the process such as control command generation by the nonvolatile memory control unit 810 and the verification process of the authorization information by the authorization information extracting unit 811, the authorization result applying unit 812, and the authorization information verifying unit 820 can be executed in parallel based on the I/O command received by the nonvolatile memory control unit 810 via the host I/F 806, whereby the performance of the information storage apparatus 800 can be improved as compared with the first embodiment.

Incidentally, as described in the first embodiment, the authorization result applying unit 812 excludes control commands for internal operations such as garbage collection, wear leveling, and patrol from the application target command of the authorization process, and permits the execution of these control commands for internal operations regardless of the authorization information.

Fifth Embodiment

A fifth embodiment is a modification of the fourth embodiment. Since an operation sequence of the fifth embodiment is substantially the same as the operation sequence of the fourth embodiment (and obvious modification), only the configuration example of the fifth embodiment will be described here.

(Functional Block Diagram)

FIG. 10 is a block diagram illustrating a configuration example of an information storage apparatus 1000 according to the fifth embodiment. In the information storage apparatus 1000 according to the fifth embodiment, a controller 1001 is different from the controller 801 of the information storage apparatus 800 according to the fourth embodiment. In particular, the internal configuration of the controller 1001 is different, and an authorization information extracting unit 1002 is placed between the host I/F 806 and the nonvolatile memory control unit 810 as in the first embodiment.

The authorization information extracting unit 1002 has a function of extracting authorization information from an I/O command after generating an identifier corresponding to the I/O command received via the host I/F 806, a function of notifying the authorization information verifying unit 820 of the generated identifier and the extracted authorization information, and a function of notifying the nonvolatile memory control unit 810 of the generated identifier and the I/O command.

(Conclusion of Fifth Embodiment)

With this configuration, an effect similar to that of the fourth embodiment can be obtained without significantly changing the existing nonvolatile memory control unit 810. That is, a process such as command generation for accessing the nonvolatile memories 804A to 804D by the nonvolatile memory control unit 810 and an authorization process by the authorization information extracting unit 1002, the authorization result applying unit 812, and the authorization information verifying unit 820 can be executed in parallel.

Sixth Embodiment

In each of the embodiments described hereinbefore, a functional element specialized for the authorization process is added to the controller. In a sixth embodiment, a general-purpose processing unit is added to the controller, and process of the authorization information and application of the authorization result are executed as one of the process executed by the general-purpose processing unit. In this way, an information storage apparatus 1100 according to the sixth embodiment can be realized as an information storage apparatus having a general-purpose processing unit such as computational storage devices, for example.

(Functional Block Diagram)

FIG. 11 is a block diagram illustrating a configuration example of the information storage apparatus 1100 according to the sixth embodiment. A reference number is newly assigned to each element of the information storage apparatus 1100. The information storage apparatus 1100 includes a controller 1101, a volatile memory 1102, a nonvolatile auxiliary memory 1103, nonvolatile memories 1104A to 1104D, a nonvolatile memory interface (I/F) 1105, and a host interface (I/F) 1106. The function and role of each component other than the controller 1101 are the same as those of the above-described embodiments.

The controller 1101 includes a nonvolatile memory control unit 1110, a general-purpose processing unit 1111, a built-in volatile memory 1112, and a pre-processing unit 1113. Similarly to the embodiments described above, the nonvolatile memory control unit 1110 generates a control command for controlling the nonvolatile memories 1104A to 1104D based on an I/O command received from the outside, and executes a process of reading and writing information from and to the nonvolatile memories 1104A to 1104D. The built-in volatile memory 1112 is a memory which is used as a temporary memory by the nonvolatile memory control unit 1110 and the processing and software operating in the general-purpose processing unit 1111. For example, the built-in volatile memory 1112 is used to hold various types of information necessary for the authorization information processing of each embodiment described above.

The pre-processing unit 1113 executes a process of receiving an I/O command via the host I/F 1106, a process of determining whether or not the received I/O command is an I/O command which requires processing in the general-purpose processing unit 1111, a process of transferring the I/O command to the general-purpose processing unit 1111 in a case where it is determined that the processing in the general-purpose processing unit 1111 is necessary, and a process of transferring the I/O command to the nonvolatile memory control unit 1110 in a case where it is determined that the processing in the general-purpose processing unit 1111 is unnecessary.

The general-purpose processing unit 1111 is a processing unit on which at least one general-purpose processor core is mounted, and can perform arbitrary processing on data exchanged with the host computer by the nonvolatile memory control unit 1110 by loading and executing software. Incidentally, the general-purpose processing unit 1111 may include a dedicated core or a reconfigurable hardware circuit (an FPGA or the like) in addition to the general-purpose processor core. The reconfigurable hardware circuit functions as a hardware operation unit which can be dynamically reconfigured by reading the configuration information.

FIG. 11 illustrates some processes realized by the software (or the reconfigurable hardware operation unit) of the general-purpose processing unit 1111. A branch process 1120 is processing which is a start point of processing in the general-purpose processing unit 1111, and determines appropriate processing to be executed by determining subsequent processing according to the I/O command or data, the state of the general-purpose processing unit 1111, the state of the nonvolatile memory control unit 1110, and the like and calls the determined processing. In a case where the authorization information is assigned to the I/O command, an authorization information extraction process 1122, an authorization information verification process 1123, and an authorization result application process 1124 are executed. If the processing related to the trust base necessary for the processing of the authorization information is necessary, a trust base control processing 1121 is executed. When general-purpose processing other than the processing of the authorization information is required, a general-purpose process 1125 is executed. This general-purpose processing is not directly related to the present invention, and thus detailed description thereof is omitted. Each process may be stored as a program in the nonvolatile auxiliary memory 1103, may be stored as a program in an area secured in the nonvolatile memories 1104A to 1104D, or may be temporarily stored as a program in the volatile memory 1102 or the built-in memory unit 1112 upon notification from the host computer. In any case, the program is loaded from a certain memory and executed by the general-purpose processing unit 1111. Alternatively, each process may be stored as configuration information of a reconfigurable hardware circuit in the nonvolatile auxiliary memory 1103.

The nonvolatile memory control unit 1110 has a function of receiving an I/O command and data processed by the general-purpose processing unit 1111 as necessary and writing the data in the nonvolatile memories 1104A to 1104D, a function of receiving an I/O command and reading and outputting the data from the nonvolatile memories 1104A to 1104D, a function of outputting the read data to the general-purpose processing unit 1111 so that the general-purpose processing unit 1111 can process the read data, and a function of executing processing necessary for maintaining the nonvolatile memories 1104A to 1104D as memories. Basically, the nonvolatile memory control unit has the same functions as those of the nonvolatile memory control unit in the first to fifth embodiments.

(Sequence Diagram and Flowchart)

The operation of the information storage apparatus 1100 according to the sixth embodiment is the same as the operation of the information storage apparatus 100 according to the first embodiment. Therefore, the detailed description here is omitted.

(Modification)

Figure 12:
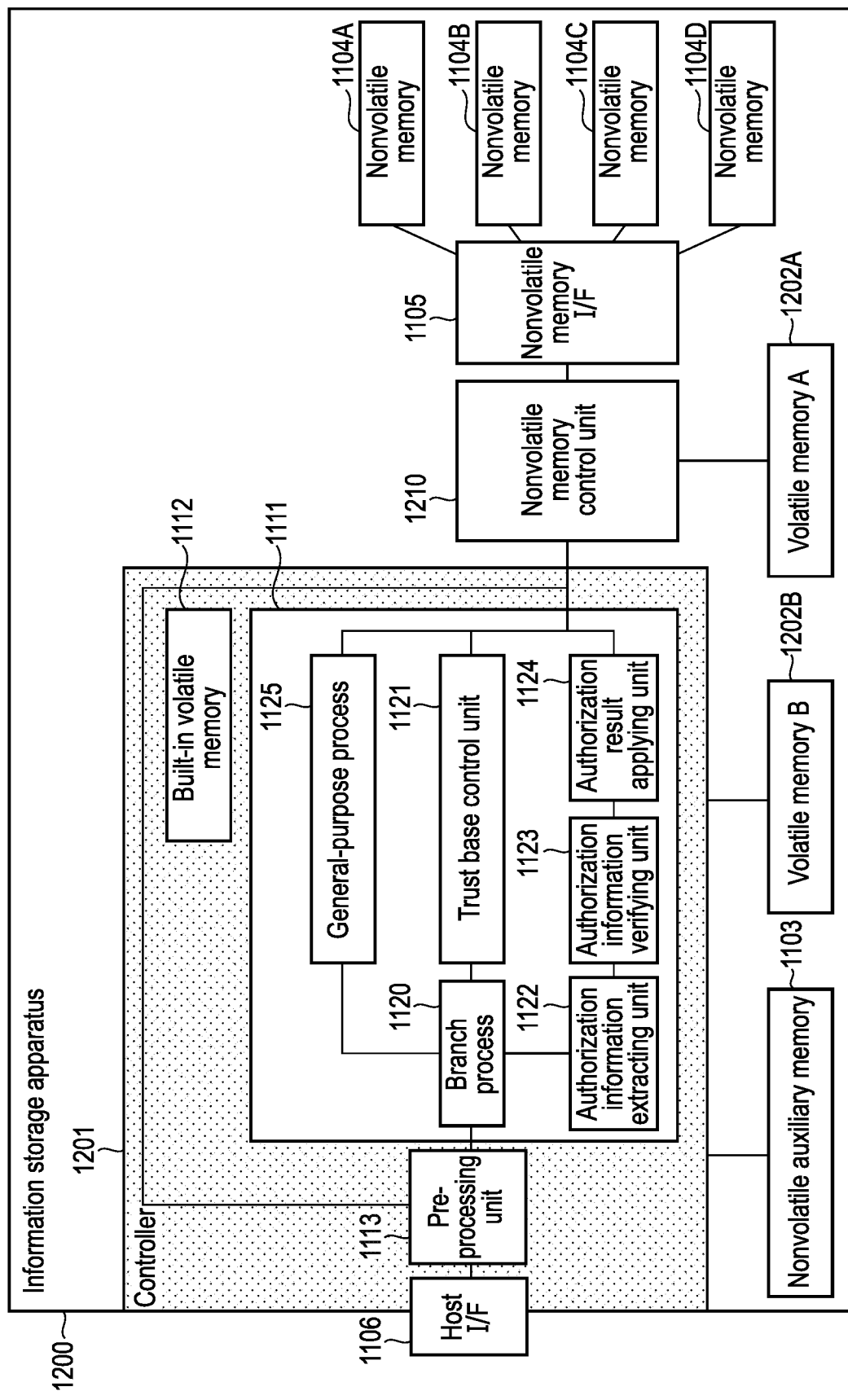
FIG. 12 is a block diagram illustrating another configuration example of the information storage apparatus according to the sixth embodiment.

An information storage apparatus 1200 in FIG. 12 is a modification of information storage apparatus 1100 of the sixth embodiment described with reference to FIG. 11, and a relationship of the information storage apparatus 1200 in FIG. 12 with respect to the information storage apparatus 1100 of the sixth embodiment is a relationship of the second embodiment with respect to the first embodiment. In the information storage apparatus 1200 in FIG. 12, the nonvolatile memory control unit 1110 incorporated in the controller 1101 in FIG. 11 is positioned as a nonvolatile memory control unit 1210 outside controller 1201, and the volatile memory 1102 in FIG. 11 is divided into a volatile memory (A) 1202A dedicated to a nonvolatile memory control unit 1210 and a volatile memory (B) 1202B dedicated to a controller 1201. With this configuration, it is easy to achieve both the processing of the existing nonvolatile memory control unit and the process of the authorization information using the general-purpose processing unit.

(Conclusion of Sixth Embodiment)

The above is the description of the sixth embodiment. When the process of the authorization information is performed by the general-purpose processing unit 1111 which is a general-purpose processing unit, the process of the authorization information can be realized by software similarly to other process, and the process of the authorization information can be easily introduced into the existing information storage apparatus. Further, as described as the modification of the sixth embodiment, the process of the authorization information can be more easily introduced by separating the controller 1201 which performs the general-purpose processing and the nonvolatile memory control unit 1210.

Seventh Embodiment

A seventh embodiment is a modification of the sixth embodiment, and a relationship of the seventh embodiment with respect to the sixth embodiment is a relationship of the fourth embodiment with respect to the first embodiment. That is, the controller which executes general-purpose processing and the nonvolatile memory control unit are arranged in parallel and can be processed in parallel. Therefore, the performance of the information storage apparatus can be expected to be improved.

(Functional Block Diagram)

Figure 13:
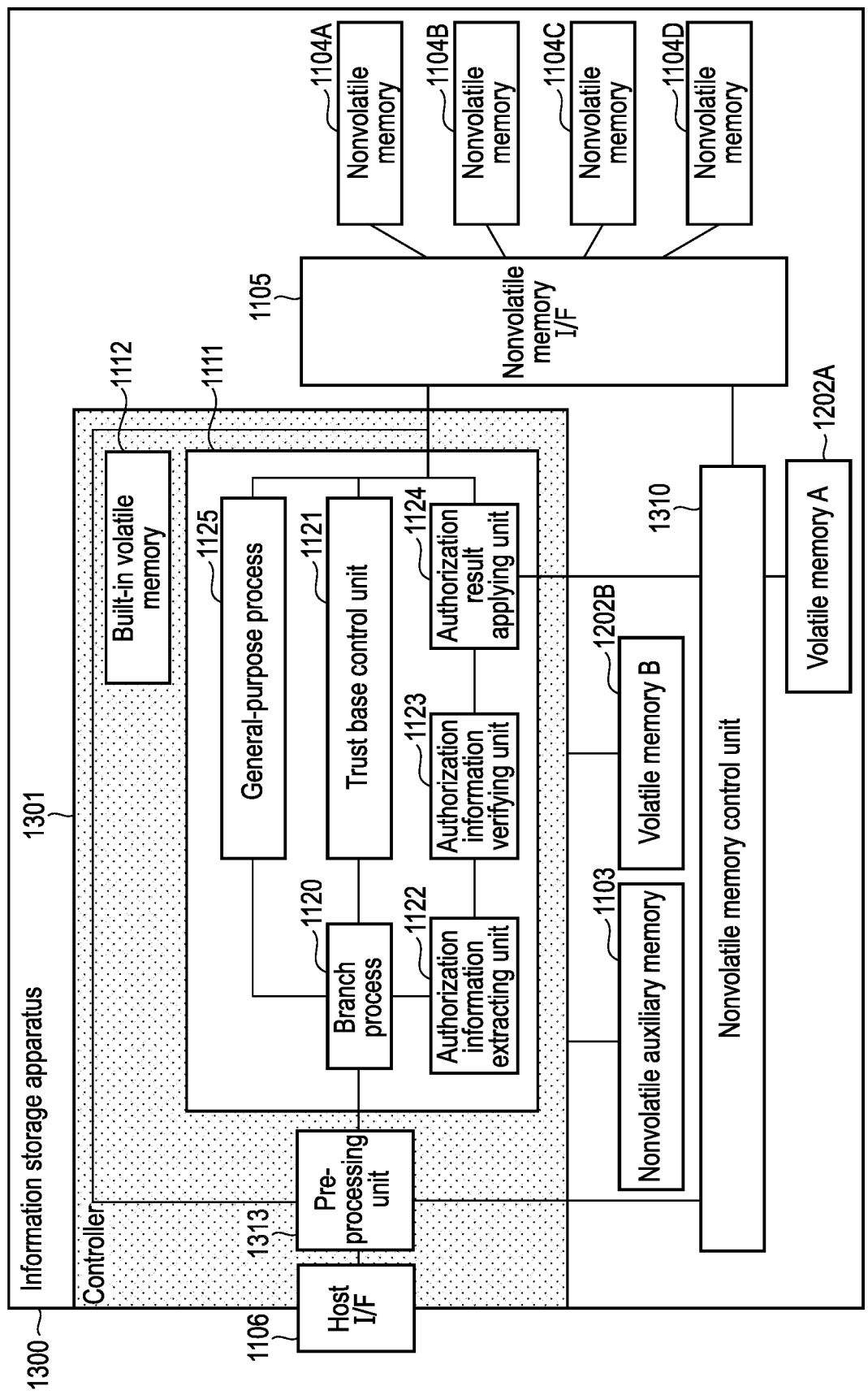
FIG. 13 is a block diagram illustrating a configuration example of an information storage apparatus according to a seventh embodiment.

FIG. 13 is a block diagram illustrating a configuration example of an information storage apparatus 1300 according to the seventh embodiment. The information storage apparatus 1300 includes a controller 1301, a nonvolatile memory control unit 1310, memories (a nonvolatile auxiliary memory 1103, a volatile memory (A) 1202A, and a volatile memory (B) 1202B) connected thereto, and interfaces (a host interface (I/F) 1106 and a nonvolatile memory interface (I/F) 1305).

Similarly to the authorization information extracting unit 1002 in the fourth embodiment, a pre-processing unit 1313 included in the controller 1301 generates an identifier from the I/O command, notifies a general-purpose processing unit 1111 of the identifier and the authorization information, and notifies the nonvolatile memory control unit 1310 of the identifier and the I/O command.

In order to apply the authorization result to the control commands, which are generated by the nonvolatile memory control unit 1310, for the nonvolatile memories 1104A to 1104D, the identifier and the control command are notified from the nonvolatile memory control unit 1310 to the authorization result application process 1124 of the general-purpose processing unit 1111. Correspondingly, the authorization result application process 1124 notifies the nonvolatile memory control unit 1310 of the propriety of execution of the control command. As a result of the authorization, in a case where the execution of the control command is permitted, the authorization result application process 1124 notifies the nonvolatile memories 1104A to 1104D of the control command notified from the nonvolatile memory control unit 1310 via the nonvolatile memory I/F 1105. In the case of non-permission, the notified control command is discarded. On the other hand, when the permission is notified from the authorization result application process 1124, the nonvolatile memory control unit 1310 performs a process of receiving the reading and writing of corresponding data, and when the non-permission is notified, the nonvolatile memory control unit discards the data. The series of processes are the same as the processes in the fourth embodiment.

(Sequence Diagram and Flowchart)

As described above, the components of the seventh embodiment are different from those of the fourth embodiment. However, the operation of the seventh embodiment is the same as that of the fourth embodiment, and thus the detailed description thereof is omitted.

(Conclusion of Seventh Embodiment)

The above is the description of the seventh embodiment. By connecting the general-purpose processing unit 1111 and the nonvolatile memory control unit 1310 in parallel, processing of both components can be executed simultaneously, and the processing performance of the information storage apparatus 1300 can be expected to be improved.

Eighth Embodiment

Next, an eighth embodiment will be described. In each of the embodiments described above, the realization method of adding the function of processing the authorization information to the information storage apparatus is described. In the eighth embodiment, an information storage apparatus is connected to a communication network via a communication interface, and a function of processing authorization information is added to a communication interface positioned at a preceding stage of the information storage apparatus, so that the authorization information can be processed.

(Functional Block Diagram)

FIG. 14 is a block diagram illustrating a configuration example of a communication interface 1400 according to the eighth embodiment. In the eighth embodiment, the function of processing the authorization information is not implemented in a controller in the information storage apparatus but implemented in the communication interface 1400. That is, in the eighth embodiment, the communication interface 1400 functions as an I/O command control apparatus configured to permit or prohibit execution of an I/O command (or a control command) by processing the authorization information.

The communication interface 1400 is realized as, for example, a network interface card (NIC) (or network interface controller). The information storage apparatus is connected to the communication network via the communication interface 1400.

The communication interface 1400 includes, as main components thereof, a network interface (I/F) 1401 connected to the communication network, a host interface (I/F) 1402 connected to the information storage apparatus via the host computer, a layer 2 (L2) processing unit 1403 that performs processing of a data link layer, particularly a MAC layer, in a communication protocol stack, a communication protocol processing unit 1404 higher than the data link layer, a storage protocol processing unit 1405 that performs processing of a storage protocol transmitted and received via a communication protocol, a trust base control unit 1406 that performs acquisition, maintenance, and management of trust information used for verification of authorization information, an authorization information processing unit 1407 that processes the authorization information, a nonvolatile auxiliary memory 1408 that holds initial setting of each functional element and a control program on the communication interface 1400, and a volatile memory 1409 that can be used as a temporary storage location of each functional element and the control program on the communication interface 1400 or a temporary storage location for packets to be transmitted and received.

The host I/F 1402 is a local bus interface for connection to a local bus such as PCIe. The host I/F 1402 functions as a control command interface.

The information storage apparatus (storage device) such as an HDD or an SSD may be directly connected to the host I/F 1402. For example, in a case where the host I/F 1402 has a function of a PCIe root complex, the host I/F 1402 can be directly connected to the information storage apparatus via a local bus such as PCIe. Hereinafter, although not limited, it is assumed that the information storage apparatus (storage device) such as an HDD or an SSD is connected to the end of the host I/F 1402 via a CPU (host CPU) of the host computer, and an I/O command for performing reading and writing on the information storage apparatus is received from an external control entity such as a client terminal through a communication network.

The network I/F 1401 receives a packet addressed to the host computer connected with the communication interface 1400, and transmits a packet addressed to another communication partner from the host computer. The network I/F 1401 corresponds to, for example, an interface such as 10 Gigabit Ethernet. The network I/F 1401 receives a datagram of a storage protocol including an I/O command by using a communication protocol.

The L2 processing unit 1403 performs the processing of the MAC layer as described above. The L2 processing unit 1403 resolves a destination MAC address of a data link layer with respect to the transmission packet generated by the communication protocol processing unit 1404, generates and assigns a data link header, and then transmits a datagram to the network at an appropriate timing. Further, the L2 processing unit 1403 receives a datagram having its own MAC address as a destination MAC address, processes a data link header, then extracts a received packet from the received datagram, and passes the received packet to the communication protocol processing unit 1404.

When transmitting data to the communication network, the communication protocol processing unit 1404 applies processing of a transport protocol (or a communication protocol such as QUIC or an encryption protocol such as TLS configured thereon) such as TCP or UDP to the data received via the host I/F 1402, further performs Internet protocol processing of IPv4 or IPv6, and then passes the data to the L2 processing unit 1403.

When receiving data from the communication network, the communication protocol processing unit 1404 receives an IPv4 datagram or an IPv6 datagram from the L2 processing unit 1403, performs processing of the Internet protocol and processing of the transport protocol, and then outputs the data via the host I/F 1402.

A series of protocol processes includes, for example, congestion control and retransmission control of TCP, management of a transmission window, calculation of a checksum, division of large transmission data into an appropriate segment size, and integration of a reception segment into an appropriate size. Incidentally, management such as path management, multicast address management, and the like may be included as processing of the Internet protocol, or a mechanism capable of controlling these settings via the host I/F 1402 may be included.

The storage protocol processing unit 1405 executes further process on the packet of the storage protocol included in the packet received and processed by the communication protocol processing unit 1404, extracts a storage command, and notifies the host computer via the host I/F 1402. Further, the storage protocol processing unit 1405 performs the process of the storage protocol on the storage command received via the host I/F 1402 so that the storage command can be passed to the communication protocol processing unit 1404. As the storage protocol, NVMe over Fabric, NVMe over TCP, iSCSI, and the like are targeted.

The trust base control unit 1406 maintains and manages the trust information used for verifying the integrity of the authorization information as described in other embodiments. However, in the eighth embodiment, the communication protocol processing unit 1404 and the L2 processing unit 1403 incorporated in the communication interface 1400 can communicate with the outside via the network I/F 1401. Accordingly, necessary trust information is acquired or updated. Specifically, a secure communication path using TLS is established between an authorization server as the generation source of the authorization information and the communication interface 1400, and a digital certificate or the like indicating, as its origin, the authorization server is acquired.

The function of the authorization information processing unit 1407 is the same as that of the embodiments described above. However, the authorization information extracting unit 1410 is different in that the authorization information is extracted from the data included in the packet processed by the communication protocol processing unit 1404 or the storage protocol processing unit 1405. For example, the authorization information processing unit 1407 extracts the authorization information which is stored in the header portion or the data portion of the communication protocol processed by the communication protocol processing unit 1404. The authorization information which is stored in the header portion or the data portion is protected such that the authorization information cannot be tampered with by the transmission source of the I/O command.

(Supplementary Matters of Functional Block Diagram)

In the block diagram of FIG. 14, a case where the authorization information processing unit 1407 is configured as an independent component is illustrated. However, the authorization information processing unit 1407 may be implemented inside the storage protocol processing unit 1405 having a close relationship. Incidentally, even when the authorization information processing unit 1407 is implemented inside the storage protocol processing unit 1405, the operation sequence does not change.

In the block diagram of FIG. 14, data to be passed to the host computer via the host I/F 1402 is data of the storage protocol. On the other hand, the host I/F 1402 may be a second network I/F, and the storage protocol may be configured as data of a storage protocol accompanied by a header of a second communication protocol or as data of a storage protocol having a different destination in a first communication protocol corresponding to the first network I/F 1401 (see the lower part of FIG. 14).

(Sequence Diagram and Flowchart)

FIG. 15 is a flowchart illustrating an operation sequence according to the eighth embodiment. In FIG. 15, only the operation when the packet is received is described. However, this is because the process of the authorization information is not performed when the packet is transmitted. The process illustrated in this flowchart is started when the network I/F 1401 receives a packet (step S1500).

The process from the packet reception process (step S1501) to the network protocol process (step S1503) is as described above in the description of the block diagram of FIG. 14. When completion is made to the process of the network protocol, the data of the storage protocol can be referred to.

When the data of the storage protocol can be referred to, the authorization information included in the data of the storage protocol (or a portion positioned between the header of the network protocol and the header of the storage protocol) can be referred to. In this regard, the authorization information extracting unit 1410 of the authorization information processing unit 1407 confirms the presence or absence of the authorization information (step S1504).

When there is no authorization information (No in step S1504), the authorization information extracting unit 1410 determines that the data of the storage protocol is invalid. In this case, the storage protocol processing unit 1405 generates an error response in the storage protocol (step S1513), and the communication protocol processing unit 1404 and the L2 processing unit 1403 perform a transmission process of transmitting the error response and return the error response to the control entity through the network I/F 1401, whereby the processing is ended.

On the other hand, in a case where the authorization information is included (Yes in step S1504), the authorization information extracting unit 1410 extracts the authorization information (step S1505), and the authorization information verifying unit 1411 verifies the integrity of the extracted authorization information (steps S1506 and S1507). Since the specific content of the verification process of verifying the integrity of the authorization information is similar to the process in each embodiment described above, the description thereof is omitted.

In a case where the authorization information does not have integrity (No in step S1507), similarly to the process (the flow starting from No in step S1504) in a case where there is no authorization information, the error is returned to the control entity, whereby the process is ended.

In a case where the authorization information has integrity (Yes in step S1507), the authorization result applying unit 1412 confirms the content (authorization result) of the authorization information (steps S1508 and S1509).

When the execution of the I/O command (storage command) is not permitted by the authorization information (No in step S1509), the authorization result applying unit 1412 instructs the storage protocol processing unit 1405 to discard the data of the storage protocol corresponding to the authorization information and generate an error response (step S1513).

When the execution of the I/O command (storage command) is permitted by the authorization information (Yes in step S1509), the authorization result applying unit 1412 instructs the storage protocol processing unit 1405 to appropriately process the storage protocol data corresponding to the authorization information. The storage protocol processing unit 1405 which receives the instruction performs appropriate process (step S1510), and notifies the host computer of the I/O command (storage command) via the host I/F 1402 (step S1511). Accordingly, the series of processes ends (step S1512). The above is the basic operation sequence in the eighth embodiment.

Incidentally, although it is described that all the processes are continuously performed in the series of operation sequences, it is not always necessary to perform the processes in such a manner. For example, the process of the storage protocol may be executed in parallel with the authorization process, and the authorization result may be applied at a stage of notifying the host computer. Such an implementation method is already described in other embodiments. That is, after generating some identifier corresponding to the received data, the storage protocol processing unit 1405 and the authorization information processing unit 1407 may proceed with the process while maintaining the correspondence relationship between the storage command and the authorization information, and the storage protocol processing unit 1405 may wait for the notification from the authorization result applying unit 1412 and notify the storage command corresponding to the identifier included in the notification to the host computer or discard the storage command.

(Conclusion of Eighth Embodiment)

The above is the eighth embodiment. By executing the verification of the authorization information and the application process of the authorization result on the communication interface 1400 which transmits and receives the storage protocol, high security can be realized also for the storage device which reads and writes information based on the I/O command (storage command) received via the communication network.

Ninth Embodiment

A ninth embodiment is a modification of the eighth embodiment. In the eighth embodiment, the authorization process is realized by a dedicated component. In the ninth embodiment, a communication interface including a general-purpose processing unit is used, and the authorization process is realized by software executed by the general-purpose processing unit or a dynamically reconfigurable dedicated circuit.

(Functional Block Diagram)

Figure 16:
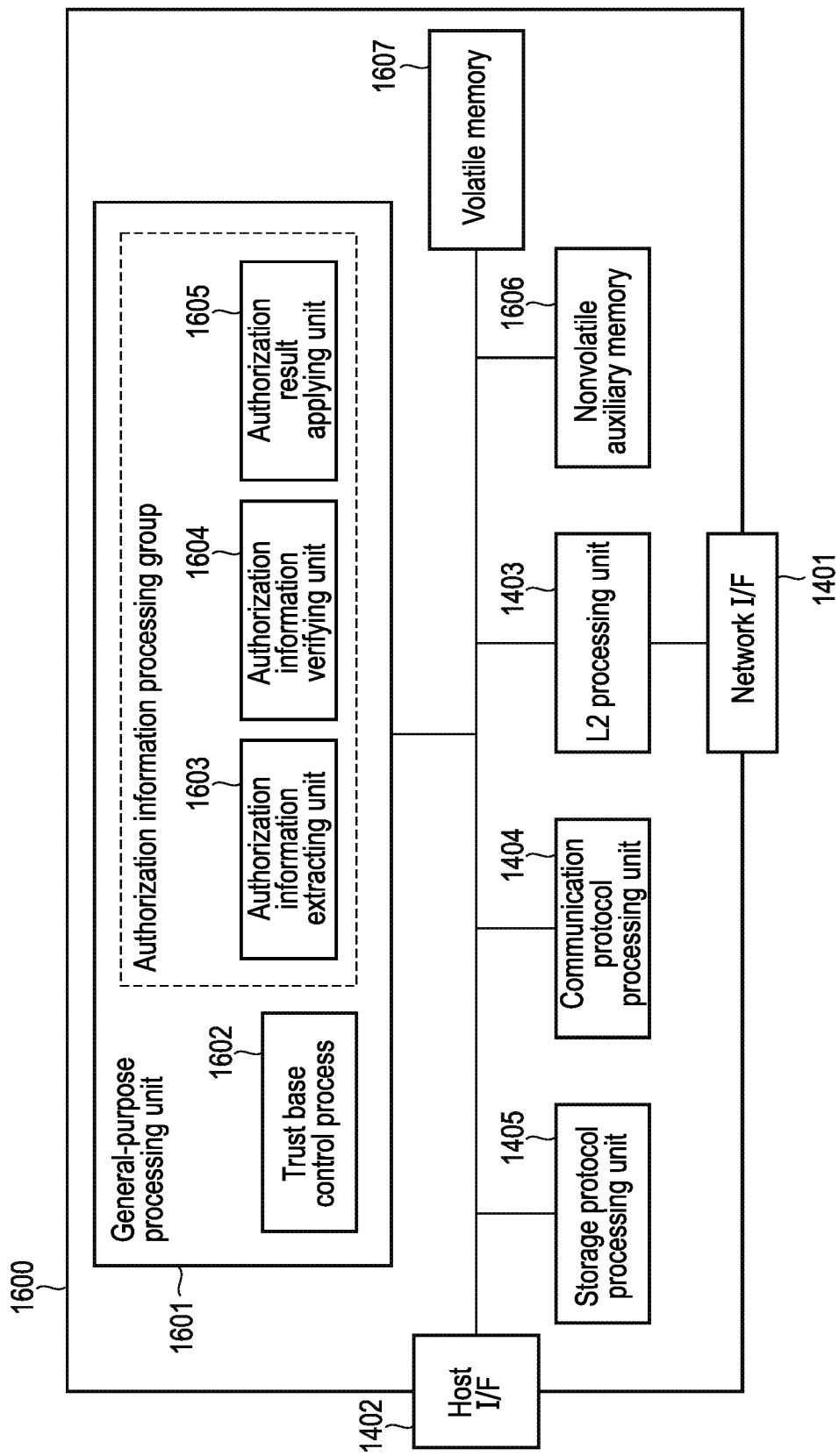
FIG. 16 is a block diagram illustrating a configuration example of a communication interface according to a ninth embodiment.

FIG. 16 is a block diagram illustrating a configuration example of a communication interface 1600 according to the ninth embodiment. Components equivalent to those of the eighth embodiment are denoted by the same reference numerals. The communication interface 1600 includes the remaining components of the eighth embodiment excluding the authorization information processing unit 1407 and the trust base control unit 1406, and a general-purpose processing unit 1601. A nonvolatile auxiliary memory 1606 holds configuration information of software executed by the general-purpose processing unit 1601 and dynamically reconfigurable hardware in addition to information necessary for initialization of each component of the communication interface 1600 or the like. A volatile memory 1607 is used as a temporary storage area required by the components of the communication interface 1600 including the general-purpose processing unit 1601 at the time of execution.

The general-purpose processing unit 1601 includes a CPU core that can be used generically by executing software and an FPGA of which the configuration can be dynamically changed based on circuit information configured in advance. Although not illustrated, the general-purpose processing unit 1601 may incorporate a small-scale volatile memory. In the volatile memory, the software executed by the CPU core or the FPGA can be used as a temporary memory. A trust base control process 1602 and an authorization information process group (an authorization information extraction process 1603, an authorization information verification process 1604, and an authorization result application process 1605) described in the general-purpose processing unit 1601 are software that executes the processing of the trust base control unit 1406 and the authorization information processing unit 1407 (the authorization information extracting unit 1410, the authorization information verifying unit 1411, and the authorization result applying unit 1412) described in the eighth embodiment, respectively.

(Supplementary Matters of Functional Block Diagram)

In FIG. 16, the trust base control process 1602, the authorization information extraction process 1603, the authorization information verification process 1604, and the authorization result application process 1605 are described as functions realized by the general-purpose processing unit 1601, but other components may be realized as software or a dynamically configurable circuit in the general-purpose processing unit 1601. That is, some of an L2 processing unit 1403, a communication protocol processing unit 1404, and a storage protocol processing unit 1405 may be realized in the general-purpose processing unit 1601.

(Sequence Diagram and Flowchart)

The operation of the communication interface 1600 according to the ninth embodiment is the same as that of the eighth embodiment. Therefore, a sequence diagram and a flowchart are omitted.

(Conclusion of Ninth Embodiment)

The above is the ninth embodiment. By executing the verification and application process of the authorization information by the software operating in the general-purpose processing unit 1601 or the dynamically reconfigurable hardware, it can be realized more easily than the eighth embodiment.

Tenth Embodiment

A tenth embodiment is realized as a storage interface to which a plurality of storage devices can be connected. The storage interface to which a plurality of storage devices can be connected is also referred to as a storage controller card. The storage interface is mounted with a storage controller. Such a storage interface to which a plurality of storage devices can be connected is used in a device such as a storage server. However, by providing a function of the authorization process in the storage interface, high safety of each storage device can be secured independently of a CPU or an OS of the storage server.

(Functional Block Diagram)

Figure 17:
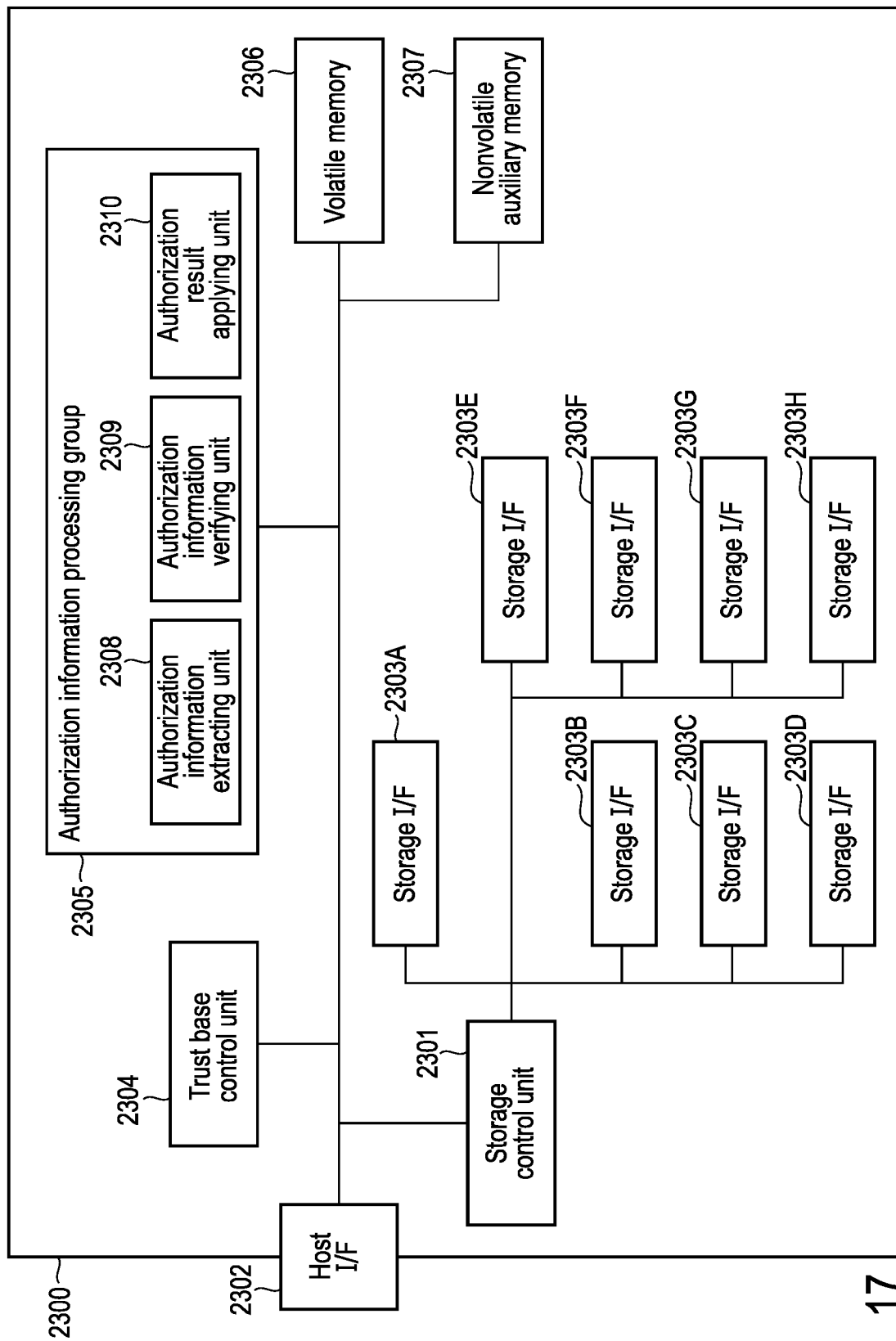
FIG. 17 is a block diagram illustrating a configuration example of a storage interface according to a tenth embodiment.

FIG. 17 is a block diagram illustrating a configuration example of a storage interface 2300 according to the tenth embodiment.

The storage interface 2300 includes a storage control unit 2301 which controls each storage device based on an instruction from the outside, a host interface (I/F) 2302 which is connected to an external host computer, storage interface (I/F) units 2303A to 2303H to which storage devices such as an SSD and an HDD can be connected, respectively, a trust base control unit 2304 which acquires trust information necessary for verification of authorization information and maintains and manages the acquired trust information, an authorization information processing unit 2305 (an authorization information extracting unit 2308, an authorization information verifying unit 2309, and an authorization result applying unit 2310 are included therein) which extracts and verifies authorization information assigned to an I/O command received via the host I/F 2302 and applies an authorization result to the I/O command, a volatile memory 2306 for each component to temporarily store information, and a nonvolatile auxiliary memory 2307 which holds initialization information of each component or the like. In this drawing, eight storage I/F units 2303A to 2303H are provided, but the number thereof is not essential.

In the tenth embodiment, for example, the part which receives the I/O command of the storage via the communication network in the eighth embodiment is changed to be directly received from a local bus such as PCIe via the host I/F 2302. Therefore, the storage interface 2300 is not provided with a network I/F, an L2 processing unit, and a network protocol processing unit related to network process. Further, in the tenth embodiment, transmission/reception control of a storage command via a network is unnecessary. Therefore, in the tenth embodiment, the storage protocol processing unit of the eighth embodiment is replaced with the storage control unit 2301. The other points are the same as those of the eighth embodiment.

FIG. 18 is a block diagram illustrating another configuration example of the storage interface according to the tenth embodiment. The storage interface 2400 of FIG. 18 is mounted with the general-purpose processing unit 2401 similarly to the ninth embodiment, and a trust base control process 2402 and an authorization information processing group (an authorization information extraction process 2403, an authorization information verification process 2404, and an authorization result application process 2405) are executed by software which can be executed thereon.

(Sequence Diagram and Flowchart)

The tenth embodiment performs the same operation as that of the eighth embodiment except that the I/O command of the storage is transmitted and received via the host I/F 2302 instead of via the network, and the I/O command after the application of the authorization result is directly exchanged with the storage device instead of via the host I/F. Therefore, a flowchart illustrating the operation sequence of the tenth embodiment will be omitted.

Eleventh Embodiment

An eleventh embodiment is an implementation example as a storage server on which the information storage apparatus described in the first to seventh embodiments is mounted, and an implementation example of a storage server including the communication interface described in the eighth or ninth embodiment.

FIG. 19 is a block diagram illustrating a configuration example of a storage server 1900 according to the eleventh embodiment. The storage server 1900 includes a communication interface 1901 which communicates with the outside via a communication network, a CPU 1902, a volatile memory 1903 in which each component in the storage server 1900 is used to temporarily store information, and a plurality of information storage apparatuses 1904 each having an arbitrary configuration among the configurations described in the first to seventh embodiments. In the storage server 1900, the trust base control process and the authorization information processing are executed in each of the information storage apparatuses 1904.

An arbitrary format can be used as the request reaching the storage server 1900 via the communication network. For example, HTTP (including HTTPS), NFS, CIFS, NVMe over Fabric, and NVMe over TCP may be used. The request received in these formats is converted into an I/O command suitable for the information storage apparatus 1904 by the CPU 1902, so that information is read and written. During the conversion, the authorization information included in the received request is appropriately maintained.

FIG. 20 is a block diagram illustrating another configuration example of the storage server according to the eleventh embodiment. A storage server 2000 illustrated in FIG. 20 includes a communication interface 2001 having the configuration described in the eighth embodiment or the ninth embodiment, a volatile memory 2002 used by each component in the storage server 2000 to temporarily store information, and a plurality of information storage apparatuses 2003. Each of the information storage apparatuses 2003 is a storage device such as an SSD or an HDD. In the storage server 2000, the trust base control process and the authorization information process are executed in the communication interface 2001.

The communication interface 2001 operates as a PCIe root complex, and each information storage apparatus 2003 operates as a PCIe endpoint. Further, as described in the supplement to the functional block diagram of the eighth embodiment, the communication interface 2001 may include two network I/Fs. For example, one may adopt a communication protocol for a LAN, and the other may adopt a communication protocol for an intra-node network. In this case, each information storage apparatus 2003 also needs to support the use of the storage protocol using the communication protocol for the intra-node network.

Figure 21:
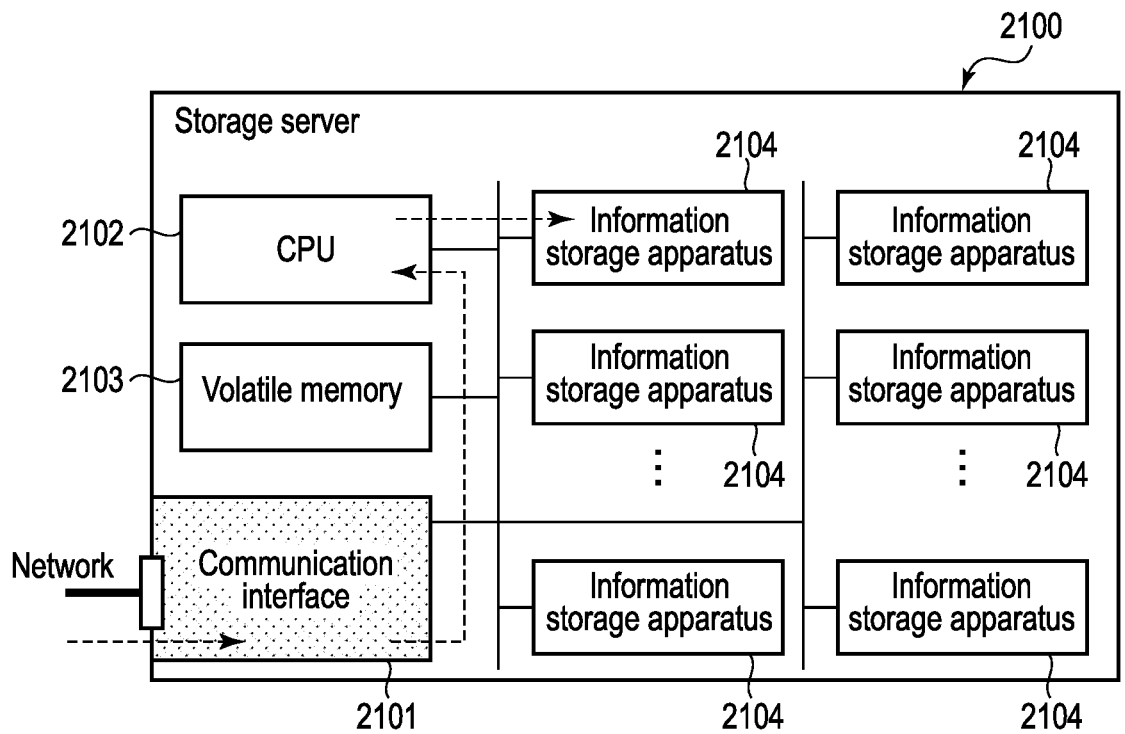
FIG. 21 is a block diagram illustrating still another configuration example of the storage server according to the eleventh embodiment.

FIG. 21 is a block diagram illustrating still another configuration example of the storage server according to the eleventh embodiment. A storage server 2100 illustrated in FIG. 21 includes a communication interface 2101 having the configuration described in the eighth embodiment or the ninth embodiment, a CPU 2102, a volatile memory 2102 used by each component in the storage server 2100 to temporarily store information, and a plurality of information storage apparatuses 2104. Each of the information storage apparatuses 2104 is a storage device such as an SSD or an HDD. In the storage server 2100, the trust base control process and the authorization information process are executed in the communication interface 2101.

Unlike the communication interface 2001 of FIG. 20, the communication interface 2101 does not function as a PCIe root complex, but includes a host I/F connected to a local bus such as PCIe, and transmits data of a storage protocol corresponding to a request received via the communication network to the CPU 2102 according to the protocol of the local bus such as PCIe. The data of the storage protocol is converted into an I/O command suitable for the information storage apparatus 2104 by the CPU 2102, so that information is read and written. In this case, in the communication interface 2001, the authorization process described in the eighth or ninth embodiment is executed. Therefore, only the data of the storage protocol corresponding to the request permitted to be executed by the authorization information is transferred from the communication interface 2001 to the CPU 2102. Then, the data of the storage protocol transferred to the CPU 2102 is converted into an I/O command suitable for the information storage apparatus 2104 by the CPU 2102.

(Architecture of Storage System)

Figure 22:
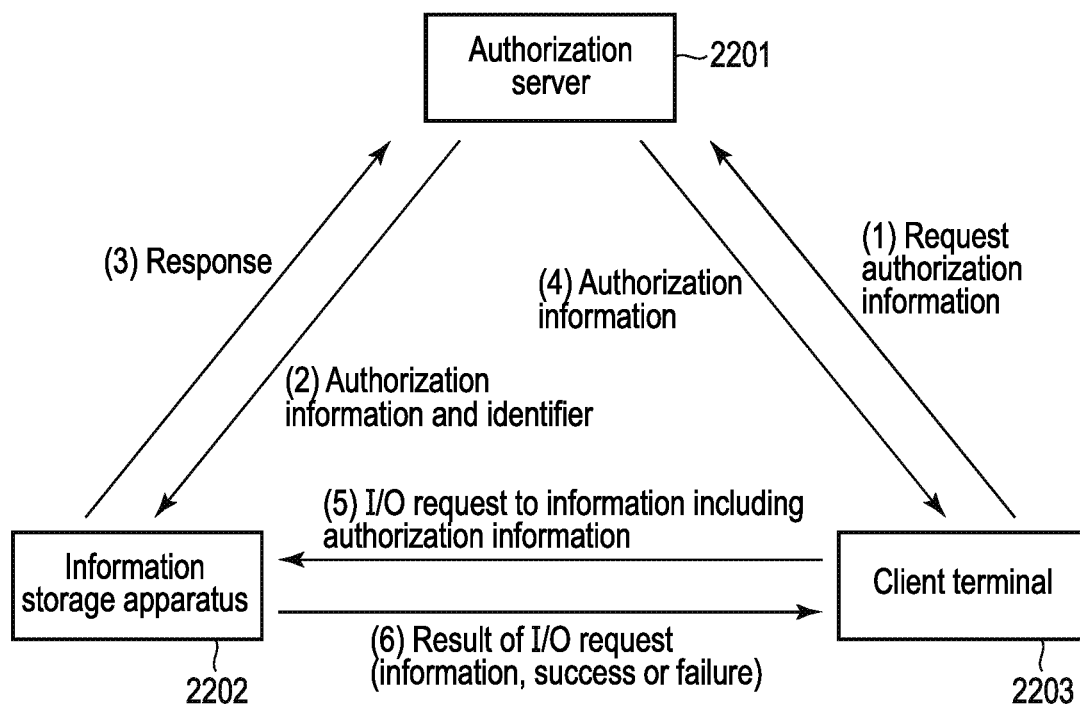
FIG. 22 is a block diagram illustrating a configuration example of a storage system including an authorization server, a client terminal, and an information storage apparatus.

FIG. 22 is a block diagram illustrating a configuration example of the entire storage system including an authorization server 2201, an information storage apparatus 2202, and a client terminal 2203.

In this storage system, the client terminal 2203 issues an access request (I/O request) for reading and writing information. In response to reception of an authorization information acquisition request specifying access target information from the client terminal 2203, the authorization server 2201 generates authorization information indicating whether or not to permit access to the access target information. At this time, in order to prevent the authorization information from being tampered with, the authorization server 2201 applies an appropriate tamper protection technique such as encryption or encrypted hash to the authorization information. The information storage apparatus 2202 is an information storage apparatus (an SSD, a communication interface connected to the SSD, a storage interface, or a storage server) having the authorization processing function described in the first to eleventh embodiments. The information storage apparatus 2202 receives an access request accompanied by the authorization information from the client terminal 2203, and determines, based on the authorization information, whether or not to permit the access request.

Incidentally, the information storage apparatus 2202 may be mounted in the same device as the client terminal 2203 or the authorization server 2201, but the verification and application of the authorization information are executed in a state independent of the CPU or software of the client terminal 2203 or the authorization server 2201. In addition, the authorization server 2201 is necessarily independent of the client terminal 2203.

The authorization process of the information storage apparatus 2202 is executed independently, but the trust base control unit (trust base control process) included in the information storage apparatus 2202 may cooperate with software executed by the host CPU connected with the information storage apparatus 2202 only at the time of initialization. At this time, the software executed by the host CPU may be firmware or the like according to UEFI instead of an advanced OS. This firmware has a function of executing only secure firmware and a function of executing secure communication with external equipment via a (general) communication interface connected to the device.

The trust base control unit in the information storage apparatus 2202 (or the communication interface) communicates with the authorization server 2201 during the execution of the firmware to bring the trust information to the latest state (for example, update of a digital certificate including a public key or update of a common key). This function may be performed every time the firmware is executed, or may be performed only when an instruction to update the trust information is given via some user interface included in the firmware.

In the client terminal 2203, the individual information to be accessed can be identified by, for example, a file name. On the other hand, when the information storage apparatus 2202 is accessed, it is necessary to specify individual information to be accessed using an address instead of a file name.

For example, a case is considered in which the information storage apparatus 2202 is a block device, and the information stored in the information storage apparatus 2202 is managed by a file system executed in the client terminal 2203. In this case, in the client terminal 2203, the application specifies individual information to be accessed using a file name. The file system converts the file name into a logical block address (LBA), and transmits the I/O command specifying the LBA to the information storage apparatus 2202.

Therefore, in order to smoothly execute the process of acquiring the authorization information from the authorization server 2201 and the process of transmitting the I/O command accompanied by the authorization information to the information storage apparatus 2202, a new technique for associating the authorization information generated by the authorization server 2201 with the I/O command transmitted from the client terminal 2203 to the information storage apparatus 2202 is required.

In the storage system of FIG. 22, by using the identifier corresponding to the authorization information generated by the authorization server 2201, the correspondence relationship between the authorization information and the I/O command transmitted from the client terminal 2203 to the information storage apparatus 2202 is maintained.

Hereinafter, a series of processes executed by the authorization server 2201, the information storage apparatus 2202, and the client terminal 2203 will be described.

(1) In a case where an access request to the information storage apparatus 2202 occurs, the client terminal 2203 transmits an authorization information acquisition request specifying access target information to the authorization server 2201.

(2), (3) The information storage apparatus 2202 receives the authorization information generated by the authorization server 2201 from the authorization server 2201. The information storage apparatus 2202 verifies the integrity of the authorization information, and, in a case where the integrity of the authorization information can be confirmed, returns a response indicating the fact to the authorization server 2201 and stores the authorization information and the identifier corresponding to the authorization information in a memory in the information storage apparatus 2202. The identifier corresponding to the authorization information may be generated by the authorization server 2201. In this case, the information storage apparatus 2202 can receive the authorization information generated by the authorization server 2201 and the identifier corresponding to the authorization information from the authorization server 2201. Alternatively, the identifier corresponding to the authorization information may be generated by the information storage apparatus 2202. In this case, the information storage apparatus 2202 executes a process of notifying the authorization server 2201 of the generated identifier.

(4) The authorization server 2201 transmits the authorization information and the identifier corresponding to the authorization information to the client terminal 2203.

(5) The client terminal 2203 receives the authorization information and the identifier corresponding to the authorization information from the authorization server 2201, and generates an access request (I/O request) including the authorization information, the I/O command for reading and writing at least a part of the access target information, and the identifier. Then, the client terminal 2203 transmits the generated access request to the information storage apparatus 2202.

(6) The information storage apparatus 2202 verifies whether the authorization information included in the access request is not tampered with and whether the information is issued from the authorization server 2201 based on the trust information necessary for verifying the integrity of the authorization information. Further, the information storage apparatus 2202 compares the authorization information included in the access request with the authorization information in the memory corresponding to the identifier in the memory matching the identifier included in the access request. In a case where the authorization information included in the access request is not tampered with and is issued from the authorization server, and the authorization information included in the access request matches the authorization information in the memory corresponding to the identifier in the memory matching the identifier included in the access request, the information storage apparatus 2202 determines that the authorization information included in the access request is correct authorization information which is not tampered with, and a correspondence relationship between the authorization information included in the access request and the identifier is also correct, and permits or prohibits the execution of the I/O command based on the authorization result indicating whether or not the authorization information included in the access request permits the execution of the I/O command.

Through the above series of processes, even in a case where the client terminal 2203 requests the authorization server 2201 for the authorization information by using the file name of the access target information, and the client terminal 2203 accesses the information storage apparatus 2202 by using the I/O command specifying the LBA, the authorization information generated by the authorization server 2201 can be associated with the authorization information transmitted together with the I/O command from the client terminal 2203 to the information storage apparatus 2202. Therefore, even in a case where the information storage apparatus 2202 is a block device, the client terminal 2203 can acquire the authorization information from the authorization server 2201 using, for example, an authorization information acquisition request specifying only a file name.

If the client terminal 2203 uses invalidly the authorization information and generates the I/O command for information different from the authorized information, the authorization information included in the access request does not match the authorization information in the memory corresponding to the identifier in the memory matching the identifier included in the access request. Therefore, the invalid access to the information storage apparatus 2202 can be prevented. Similarly, even if the storage server (FIG. 19) including the information storage apparatus 2202 is attacked by malware or the like, and an invalid I/O command is generated, the execution of the invalid I/O command can be prevented.

Incidentally, the authorization server 2201 may transmit a pair of the authorization information including the identifier and the identifier to the client terminal 2203. In this case, the client terminal 2203 receives the pair of the authorization information including the identifier and the identifier from the authorization server 2201, generates an access request (I/O command) including the received authorization information, and stores the received identifier in metadata of the access request (I/O command). For example, in a case where NVMe is used as the storage protocol, the received identifier may be assigned as NVMe metadata to the I/O command of the NVMe. In this way, the client terminal 2203 generates the access request including the authorization information (including the identifier), the identifier, and the I/O command.

When the access request is received from the client terminal 2203, the information storage apparatus 2202 may execute a process of comparing the identifier included in the authorization information with the identifier included in the metadata of the I/O command in addition to the above-described verification process.

When the identifier included in the authorization information does not match the identifier included in the metadata of the I/O command, the information storage apparatus 2202 discards the received access request and does not execute the received access request. Therefore, even in this case, the invalid access to the information storage apparatus 2202 can be prevented.

In a case where the client terminal 2203 reads and writes a file stored in information storage apparatus 2202, a plurality of I/O commands may be transmitted from the client terminal 2203 to the information storage apparatus 2202. For example, when a certain file is read, the plurality of I/O commands (READ commands), for example, 100 I/O commands (READ commands) are transmitted from the client terminal 2203 to the information storage apparatus 2202. In this case, a configuration may be applied in which only the authorization information corresponding to a first READ command is transmitted to the information storage apparatus 2202, and the transmission of the authorization information corresponding to each of the second to 99th READ commands is omitted. Accordingly, a processing load on the information storage apparatus 2203 (or the communication interface) can be reduced.

In this case, in the information storage apparatus 2203 (or the communication interface), in a case where the authorization information receiving unit receives the first authorization information corresponding to the first I/O command and does not receive the second authorization information corresponding to the second I/O command related to the first I/O command, the authorization applying unit permits or prohibits the execution of the second I/O command based on the authorization result of the first authorization information already stored in the memory in the information storage apparatus 2203 (or the communication interface).

For example, the first I/O command is the first READ command for reading a certain file. In a case where the authorization result of the first authorization information corresponding to the first READ command indicates "executable", the first READ command is executed. On the other hand, in a case where the authorization result of the first authorization information indicates "non-executable", the first READ command is not executed.

The second I/O command is, for example, a second READ command for reading this file. In a case where a condition is satisfied in which an LBA range specified by the second READ command is continuous with an LBA range specified by the first READ command, the second READ command can be determined to be a command associated with the first READ command. In this case, in a case where the second authorization information corresponding to this second READ command is not received, the authorization applying unit applies the authorization result of the first authorization information corresponding to the first READ command to the second READ command.

(Case where Authorization Server 2201 Leads Generation of Identifier)

Next, a method in which the authorization server 2201 takes an initiative to determine the identifier will be described.

Figure 23:
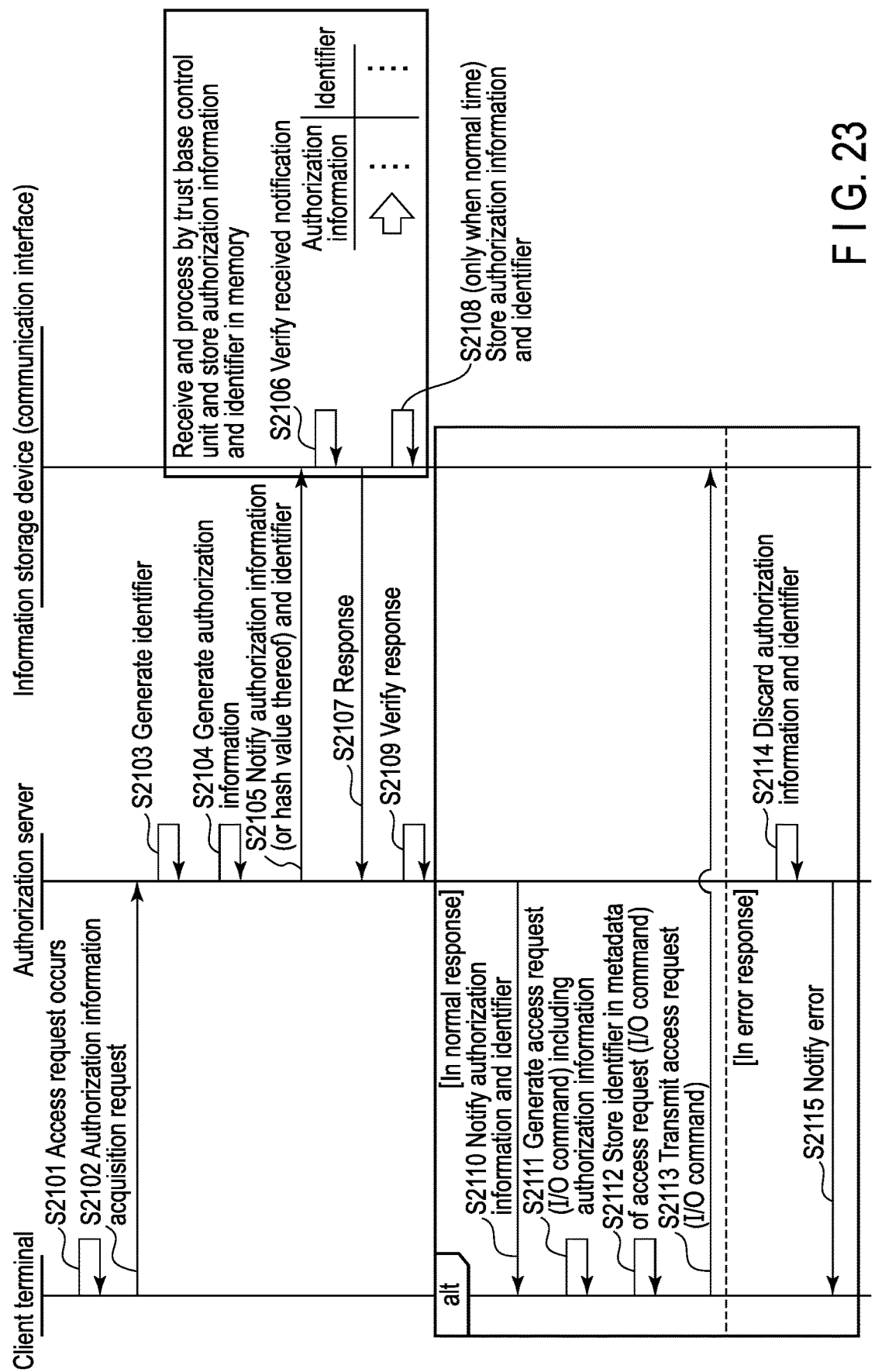
FIG. 23 is a sequence diagram illustrating a procedure of a series of processes executed in the storage system of FIG. 22 in a case where the authorization server takes an initiative to generate an identifier.

FIG. 23 is a sequence diagram illustrating a procedure of a series of processes executed in the storage system of FIG. 22 in a case where the authorization server 2201 takes an initiative to generate the identifier.

In a case where an access request for information is generated in the client terminal 2203 (step S2101), the client terminal 2203 generates an authorization information acquisition request using, for example, a file name specifying the access target information, and transmits the generated authorization information acquisition request to the authorization server 2201 (step S2102).

Upon receiving the authorization information acquisition request from the client terminal 2203, the authorization server 2201 generates an identifier corresponding to authorization information before generating the authorization information (step S2103). This identifier is used to associate the authorization information to be generated with an I/O command which is subsequently issued from the client terminal 2203. Then, the authorization server 2201 generates the authorization information indicating whether or not to permit the access to the access target information (the execution of the I/O command) in consideration of an access right of the client terminal 2203 to the access target information specified by the authorization information acquisition request (step S2104). In step S2104, the authorization server 2201 applies an appropriate tamper protection technique such as encryption or encrypted hash to the generated authorization information. Then, the authorization server 2201 transmits the authorization information (or a hash value thereof) and the identifier to the information storage apparatus 2202 (or the communication interface) (step S2105). In step S2105, the authorization server 2201 may also apply an appropriate tamper protection technique such as encryption or encrypted hash to the identifier.

Incidentally, the generated authorization information itself may also include this identifier. In this case, the generated authorization information may have a field for storing the identifier. In step S2104, the authorization server 2201 generates the authorization information including the identifier by storing the generated identifier in this field of the authorization information. The authorization server 2201 applies an appropriate tamper protection technique to the authorization information including the identifier. Then, the authorization server 2201 transmits the authorization information including the identifier and the identifier to the information storage apparatus 2202 (or the communication interface). Alternatively, the authorization server 2201 may transmit the hash value of the authorization information including the identifier and the identifier to the information storage apparatus 2202 (or the communication interface).

Hereinafter, although not limited, a case where the authorization server 2201 transmits the authorization information (or the hash value thereof) including the identifier and the identifier to the information storage apparatus 2202 will be described as an example. Further, in the following description, the authorization information including the identifier is simply used as the authorization information unless otherwise specified.

The trust base control unit of the information storage apparatus 2202 (or the communication interface) receives the authorization information (or the hash value thereof) and the identifier by some means and verifies the integrity of both the authorization information and the identifier (step S2106).

When the integrity of each of the authorization information and the identifier is confirmed, the trust base control unit of the information storage apparatus 2202 (or the communication interface) returns a normal response to the authorization server 2201 (step S2107), and stores the authorization information and the identifier in the memory (the built-in volatile memory or the volatile memory) (step S2108).

On the other hand, in a case where it is detected that the authorization information or the identifier is tampered with, the trust base control unit of the information storage apparatus 2202 (or the communication interface) returns an error response to the authorization server 2201 (step S2107), and discards the authorization information and the identifier.

The authorization server 2201 verifies the response received from the information storage apparatus 2202 (or the communication interface) (step S2109), and transmits the authorization information and the identifier to the client terminal 2203 in a case where the response is a normal response (step S2110).

The client terminal 2203 receives the authorization information and the identifier from the authorization server 2201. The client terminal 2203 generates an access request (I/O command) including the received authorization information (step S2111), and stores the received identifier in metadata of the access request (I/O command) (step S2112). In other words, the client terminal 2203 generates the access request including the authorization information, the identifier, and the I/O command. The client terminal 2203 transmits the generated access request (I/O command) to the information storage apparatus 2202 (or the communication interface) (step S2113).

When receiving the access request, the information storage apparatus 2202 (or the communication interface) compares the authorization information included in the access request with the authorization information in the memory corresponding to the identifier in the memory matching the identifier included in the access request. In a case where the authorization information included in the access request does not match the authorization information in the memory corresponding to the identifier in the memory matching the identifier included in the access request, the information storage apparatus 2202 (or the communications interface) discards the received access request and does not execute the I/O command of the received access request.

In a case where the response received from the information storage apparatus 2202 (or the communication interface) in step S2107 is an error response, the authorization server 2201 discards the generated authorization information and the generated identifier held in the authorization server 2201 (step S2114). Then, the authorization server 2201 notifies the client terminal 2203 of the error (step S2115).

Incidentally, the information storage apparatus 2202 (or the communication interface) compares the identifier included in the authorization information in the access request with the identifier stored in the metadata of the I/O command, and discards the received access request in a case where the identifiers do not match each other.

The above is the process in which the authorization server 2201 takes an initiative to generate the identifier and construct the correspondence relationship between the authorization information and the I/O command. As described in this operation sequence, this correspondence relationship does not depend on an information storage method (block device, KVS distinction) of the information storage apparatus 2202. This correspondence relationship does not also depend on the actual storage location of the identifier of the information requested to be accessed by the client terminal 2203. Therefore, the present invention can be applied to various formats.

(Case where Information Storage Apparatus 2202/Communication Interface Leads Generation of Identifier)

Next, a method will be described in which the information storage apparatus 2202 (or the communication interface) takes an initiative to generate the identifier.

Figure 24:
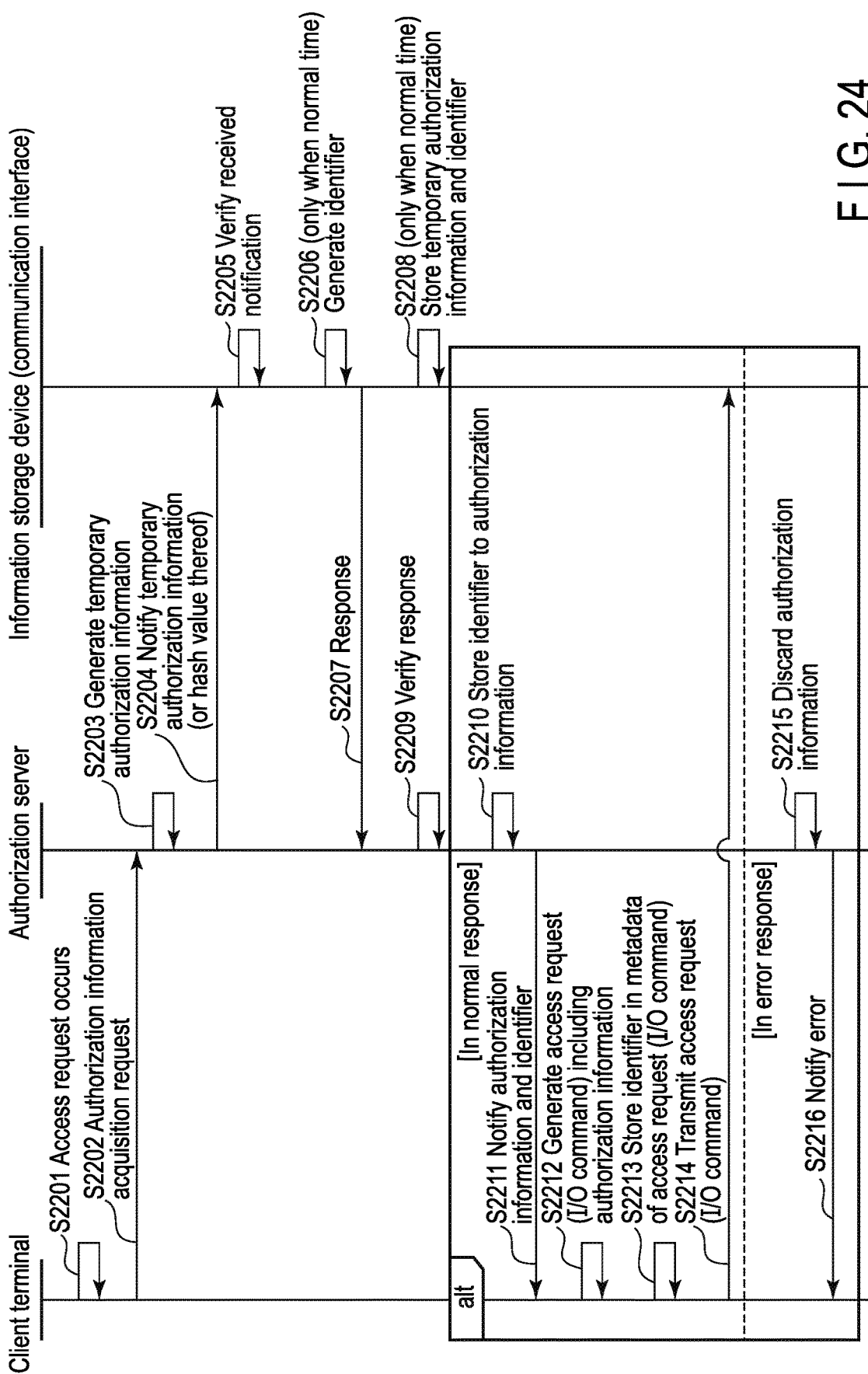
FIG. 24 is a sequence diagram illustrating a procedure of a series of processes executed in the storage system of FIG. 22 in a case where the information storage apparatus takes an initiative to generate an identifier.

FIG. 24 is a sequence diagram illustrating a procedure of a series of processes executed in the storage system in a case where the information storage apparatus 2202 (or the communication interface) takes an initiative to generate the identifier.

In a case where an access request for information is generated in the client terminal 2203 (step S2201), the client terminal 2203 generates an authorization information acquisition request using, for example, a file name specifying access target information, and transmits the generated authorization information acquisition request to the authorization server 2201 (step S2202).

Upon receiving the authorization information acquisition request from the client terminal 2203, the authorization server 2201 generates authorization information (step S2203). The authorization server 2201 at this time does not grasp the identifier. Therefore, for example, a bit string of zero is set in a field in the authorization information used to store the identifier. The authorization information in which the bit string of zero is set in the field for storing the identifier is referred to as temporary authorization information in the following. The authorization server 2201 applies an appropriate tamper protection technique such as encryption or encrypted hash to the temporary authorization information (or the hash value thereof). Then, the authorization server 2201 transmits the temporary authorization information (or the hash value thereof) to the information storage apparatus 2202 (or the communication interface) (step S2204).

The trust base control unit of the information storage apparatus 2202 (or the communication interface) which receives the temporary authorization information (or the hash value thereof) receives the temporary authorization information (or the hash value thereof) by some means and verifies the integrity of the temporary authorization information (step S2205).

When the integrity of the temporary authorization information is confirmed, the trust base control unit of the information storage apparatus 2202 (or the communication interface) generates an identifier corresponding to the temporary authorization information (step S2206). In a case where the identifier (such as a file name) capable of specifying the access target information together with the temporary authentication information is notified from the authorization server 2201, and the information regarding the storage position in the information storage apparatus 2201 can be specified based on the identifier, the trust base control unit may generate an identifier corresponding to the temporary authorization information in consideration of the information. The trust base control unit returns a normal response including the generated identifier to the authorization server 2201 (step S2207). Further, the trust base control unit stores the authorization information and the identifier in the memory (the built-in volatile memory or the volatile memory) (step S2208).

On the other hand, in a case where it is detected that the temporary authorization information is tampered with, the trust base control unit of the information storage apparatus 2202 (or the communication interface) returns an error response to the authorization server 2201 (step S2207). In this case, the process of generating the identifier is not executed. Further, the temporary authorization information is discarded.

The authorization server 2201 verifies the response received from the information storage apparatus 2202 (or the communication interface) (step S2209), and in a case where the response is a normal response, stores the identifier generated by the information storage apparatus 2202 (or the communication interface) in a field in the temporary authorization information for storing the identifier, thereby generating authorization information including the identifier (step S2210). The authorization server 2201 transmits the generated authorization information and the identifier to the client terminal 2203 (step S2211).

The client terminal 2203 receives the authorization information and the identifier from the authorization server 2201. The client terminal 2203 generates an access request (I/O command) including the received authorization information (step S2212), and stores the received identifier in metadata of the access request (I/O command) (step S2112). In other words, the client terminal 2203 generates the access request including the authorization information, the identifier, and the I/O command. The client terminal 2203 transmits the generated access request (I/O command) to the information storage apparatus 2202 (or the communication interface) (step S2214).

When receiving the access request, the information storage apparatus 2202 (or the communication interface) compares the authorization information included in the access request with the authorization information (temporary authorization information) in the memory corresponding to the identifier in the memory matching the identifier included in the access request. In the temporary authorization information, a bit string of zero is set in a field for storing the identifier. Therefore, in this comparison process, the information storage apparatus 2202 (or the communication interface) converts the bit string of this field of the authorization information included in the access request into a bit string of zero, and compares the authorization information subjected to this conversion with the authorization information (temporary authorization information) in the memory. In a case where the authorization information included in the access request does not match the authorization information (temporary authorization information) in the memory corresponding to the identifier in the memory matching the identifier included in the access request, the information storage apparatus 2202 (or the communications interface) discards the received access request and does not execute the I/O command of the received access request.

In a case where the response received from the information storage apparatus 2202 (or the communication interface) in step S2207 is an error response, the authorization server 2201 discards the generated temporary authorization information held in the authorization server 2201 (step S2215). Then, the authorization server 2201 notifies the client terminal 2203 of an error (step S2216).

Incidentally, the information storage apparatus 2202 (or the communication interface) compares the identifier included in the authorization information in the access request with the identifier stored in the metadata of the I/O command, and discards the received access request in a case where the identifiers do not match each other.

(Case of Using Identifier Notified from Terminal)

In the above description, a case has been described in which the authorization server 2201 or the information storage apparatus 2202 generates the identifier used to maintain the correspondence relationship between the authorization information and the I/O command, but the client terminal 2203 may generate the identifier.

In this case, when requesting the authorization information, the client terminal 2203 generates an authorization information acquisition request including an identifier, and the authorization server 2201 generates authorization information including the identifier. At this time, the authorization server 2201 prevents a third party from tampering with the identifier and the authorization information by applying an appropriate tamper protection technique such as encryption or encrypted hash to the authorization information.

The client terminal 2203 generates an access request (I/O command) including the authorization information, and stores the identifier in metadata of the access request (I/O command). In other words, the client terminal 2203 generates the access request including the authorization information, the identifier, and the I/O command. The client terminal 2203 transmits the generated access request (I/O command) to the information storage apparatus 2202 (or the communication interface).

In addition to the verification process described in each embodiment, the information storage apparatus 2202 (or the communication interface) compares the identifier included in the authorization information in the access request with the identifier stored in the metadata of the I/O command, and performs a process of discarding the received access request in a case where these identifiers do not match each other.

(Transmission Timing)

In each of the embodiments described above, the I/O command for controlling information storage apparatus 2202 includes the authorization information and the meta information and is transmitted at a time. The I/O command may be divided into a plurality of pieces and transmitted. In this case, the identifiers described in FIGS. 23 and 24 may be used to maintain the correspondence relationship. That is, the identifier is assigned to the meta information of the I/O command and transmitted, and the authorization information including the same identifier is independently transmitted therebefore or thereafter. Accordingly, for example, a dedicated command for transmitting the authorization information can be added, thereby simplifying a process of extracting the authorization information.

By using the expiration date included in the authorization information, it is possible to control whether or not to execute a plurality of I/O commands with one authorization information. Accordingly, it is possible to cope with the trade-off between overhead and efficiency associated with authorization.

As described above, the method of constructing the correspondence relationship between the authorization information and the I/O command has been described in each embodiment. By introducing this mechanism, it is possible to prevent invalid reading of information even in a case where a storage server (FIG. 19) mounted with the information storage apparatus 2202 (or the communication interface) is attacked by invalid software such as malware.

As described above, according to the information storage apparatus or the communication interface of the first to eleventh embodiments, the authorization information receiving unit receives, via the I/O command interface, the authorization information which indicates whether or not to permit the execution of the I/O command and is protected to prevent being tampered with by the transmission source of the I/O command. The authorization information verifying unit verifies whether the received authorization information is not tampered with and whether the information is issued from a known authorization server, and in a case where the received authorization information is not tampered with and is issued from the known authorization server, the authorization information verifying unit verifies whether or not the received authorization information permits the execution of the I/O command. The authorization applying unit permits or prohibits the execution of the I/O command or the control command generated from the I/O command based on the authorization result indicating whether or not the received authorization information permits the execution of the I/O command. Therefore, even in a case where a malicious program intrudes into the software executed in the host computer, the client terminal, or the storage server, the invalid access to the storage device can be prevented.

Incidentally, it is not necessary to assign the authorization information to all the I/O commands received by the information storage apparatus or the communication interface. For example, in a case where a file system is constructed on the information storage apparatus, the reading and writing of the meta information and journaling information of the file system may be excluded from a target to be authorized, and an operation (a read operation on a directory) of acquiring a list of files included in the directory may be excluded from the target to be authorized. Similarly, it may be implemented to request the authorization information only for reading and writing the information itself.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An I/O command control apparatus configured to be connected to a storage device which reads and writes information based on an I/O command, the apparatus comprising:
an I/O command interface configured to receive the I/O command from an external control entity;
a control command interface configured to transmit, to the storage device, a control command for controlling the storage device, the control command being generated based on the I/O command;
an authorization information receiving unit configured to receive, via the I/O command interface, authorization information indicating whether or not to permit execution of the I/O command, the authorization information being protected such that the authorization information cannot be tampered with by a transmission source of the I/O command;
an authorization information verifying unit configured to verify whether the received authorization information is not tampered with and whether the received authorization information is issued from a known authorization server, and verify whether or not the received authorization information permits the execution of the I/O command in a case where the received authorization information is not tampered with and is issued from the known authorization server;
an authorization applying unit configured to permit or prohibit the execution of the I/O command or execution of the control command generated from the I/O command, based on an authorization result indicating whether or not the received authorization information permits the execution of the I/O command;
a trust base control unit configured to acquire trust information used by the authorization information verifying unit to verify whether the received authorization information is not tampered with and whether the received authorization information is issued from the known authorization server, and maintain and manage the acquired trust information; and
a storage control unit configured to generate the control command based on the I/O command.

2. The I/O command control apparatus according to claim 1, further comprising:
a memory configured to temporarily hold data, wherein
the authorization information includes first identification information capable of specifying the I/O command corresponding to the authorization information,
the authorization information verifying unit is configured to:
extract the first identification information from the authorization information; and
store the authorization result and the extracted first identification information in the memory in a state where the authorization result and the extracted first identification information are associated with each other,
the authorization information receiving unit is configured to:
generate second identification information capable of specifying the I/O command, based on the I/O command; and
store the I/O command and the second identification information in the memory in a state where the I/O command and the second identification information are associated with each other, and
the authorization applying unit is configured to:
verify whether or not the first identification information matching the second identification information is stored in the memory;
permit the execution of the I/O command or the execution of the control command generated from the I/O command in a case where the first identification information matching the second identification information is stored in the memory, and the authorization result associated with the first identification information permits the execution of the I/O command; and
prohibit the execution of the I/O command or the execution of the control command generated from the I/O command in a case where the first identification information matching the second identification information is not stored in the memory or a case where the first identification information matching the second identification information is stored in the memory, and the authorization result associated with the first identification information does not permit the execution of the I/O command.

3. The I/O command control apparatus according to claim 1, wherein
the authorization information receiving unit is configured to:
receive the I/O command to which the authorization information is assigned; and
extract the authorization information from the received I/O command, and
the authorization applying unit is configured to:
permit or prohibit the execution of the received I/O command based on the authorization result of the extracted authorization information.

4. The I/O command control apparatus according to claim 3, further comprising:
a memory that temporarily holds data, wherein
the authorization information verifying unit is configured to:
generate first identification information capable of specifying the received I/O command, based on the extracted authorization information; and
store the authorization result of the extracted authorization information and the first identification information in the memory in a state where the authorization result and the first identification information are associated with each other,
the authorization information receiving unit is configured to:
generate second identification information capable of specifying the received I/O command, based on the received I/O command; and
store the received I/O command and the second identification information in the memory in a state where the received I/O command and the second identification information are associated with each other, and
the authorization applying unit is configured to:
verify whether or not the first identification information matching the second identification information is stored in the memory;
permit the execution of the received I/O command in a case where the first identification information matching the second identification information is stored in the memory, and the authorization result associated with the first identification information permits the execution of the received I/O command; and prohibit the execution of the received I/O command in a case where the first identification information matching the second identification information is not stored in the memory or a case where the first identification information matching the second identification information is stored in the memory, and the authorization result associated with the first identification information does not permit the execution of the received I/O command.

5. The I/O command control apparatus according to claim 2, wherein the authorization applying unit is configured to:

in a case where the authorization information receiving unit receives first authorization information corresponding to a first I/O command and does not receive second authorization information corresponding to a second I/O command related to the first I/O command, permit or prohibit execution of the second I/O command, based on an authorization result of the first authorization information stored in the memory.

6. The I/O command control apparatus according to claim 1, further comprising:

a nonvolatile auxiliary memory that holds the trust information, wherein the trust base control unit is configured to:

acquire at least one of a digital certificate including a public key and a common key as the trust information via the I/O command interface during initialization of the I/O command control apparatus or during operation of the I/O command control apparatus; and newly store the acquired trust information in the nonvolatile auxiliary memory or update the trust information already stored in the nonvolatile auxiliary memory with the acquired trust information.

7. The I/O command control apparatus according to claim 1, further comprising:

a general-purpose processing unit which comprises at least one of a processor capable of executing software or a hardware operation unit dynamically reconfigurable by reading configuration information; and a nonvolatile auxiliary memory configured to hold the software executed by the general-purpose processing unit or the configuration information of the dynamically reconfigurable hardware operation unit, wherein at least one of the authorization information receiving unit, the authorization information verifying unit, the authorization applying unit, and the trust base control unit is realized by the software executed by the general-purpose processing unit or the dynamically reconfigurable hardware operation unit.

8. The I/O command control apparatus according to claim 7, wherein the general-purpose processing unit is configured to:

acquire the software executed by the general-purpose processing unit or the configuration information of the dynamically reconfigurable hardware operation unit via the I/O command interface immediately after initialization of the I/O command control apparatus, and store the software or the configuration information in the nonvolatile auxiliary memory; and read the stored software from the nonvolatile auxiliary memory and execute the software, or read the configuration information from the nonvolatile auxiliary memory and reconfigure the hardware operation unit.

9. The I/O command control apparatus according to claim 1, further comprising:

a nonvolatile memory, wherein the I/O command interface is a local bus interface which receives the I/O command, and transmits and receives data in a protocol of a local bus, the control command interface is an interface which transmits a command for controlling the nonvolatile memory to the nonvolatile memory, and transmits and receives data between the storage control unit and the nonvolatile memory, and the storage control unit is configured to generate the command for controlling the nonvolatile memory as the control command, based on the I/O command.

10. The I/O command control apparatus according to claim 9, further comprising:

a general-purpose processing unit which comprises at least one of a processor capable of executing software or a hardware operation unit dynamically reconfigurable by reading configuration information; and a nonvolatile auxiliary memory configured to hold the software executed by the general-purpose processing unit or the configuration information of the dynamically reconfigurable hardware operation unit, wherein at least one of the authorization information receiving unit, the authorization information verifying unit, the authorization applying unit, and the trust base control unit is realized by the software executed by the general-purpose processing unit or the dynamically reconfigurable hardware operation unit.

11. The I/O command control apparatus according to claim 9, wherein the authorization applying unit is configured to permit execution of a control command used for an internal operation executed by the storage control unit for maintenance and management of the nonvolatile memory regardless of the authorization information.

12. The I/O command control apparatus according to claim 1, wherein:

the I/O command interface is a communication interface configured to transmit and receive a datagram of a storage protocol by a communication protocol, and the datagram of the storage protocol received by the communication protocol includes the I/O command, the control command interface is a local bus interface for connecting to a local bus, the I/O command control apparatus further comprises a communication protocol processing unit configured to process the communication protocol, the storage control unit is configured to execute a storage protocol process of processing the storage protocol to convert the I/O command into the control command transmittable and receivable via the local bus, and the authorization information receiving unit is configured to extract the authorization information which is stored in a header portion or a data portion of the communication protocol processed by the communication protocol processing unit, the authorization information which is stored in the header portion or the data portion of the communication protocol being protected such that the authorization information cannot be tampered with by the transmission source of the I/O command.

13. The I/O command control apparatus according to claim 12, further comprising:

a general-purpose processing unit which comprises at least one of a processor capable of executing software or a hardware operation unit dynamically reconfigurable by reading configuration information; and a nonvolatile auxiliary memory configured to hold the software executed by the general-purpose processing unit or the configuration information of the dynamically reconfigurable hardware operation unit, wherein at least one of the authorization information receiving unit, the authorization information verifying unit, the authorization applying unit, and the trust base control unit is realized by the software executed by the general-purpose processing unit or the dynamically reconfigurable hardware operation unit.

14. A storage system which comprises a client terminal configured to issue an access request for reading and writing information, an authorization server configured to generate, in response to reception of an authorization information acquisition request specifying access target information from the client terminal, authorization information indicating whether or not to permit access to the access target information, and an information storage apparatus configured to receive the access request accompanied by the authorization information from the client terminal and to determine whether or not to permit the access request based on the authorization information, wherein the information storage apparatus is configured to:

receive, from the authorization server, the authorization information generated by the authorization server; and store, in a memory, the authorization information generated by the authorization server and an identifier corresponding to the authorization information, the client terminal is configured to:

receive, from the authorization server, the authorization information and the identifier corresponding to the authorization information; and generate an access request which includes the authorization information, an I/O command for reading and writing at least a part of the access target information, and the identifier, and transmits the generated access request to the information storage apparatus, and the information storage apparatus is further configured to:

in a case where the access request is received from the client terminal, verify whether the authorization information included in the access request is not tampered with and whether the authorization information is issued from the authorization server, based on trust information necessary for verifying integrity of the authorization information;

compare the authorization information included in the access request with the authorization information in the memory corresponding to the identifier in the memory matching the identifier included in the access request; and permit or prohibit execution of the I/O command based on an authorization result indicating whether or not the authorization information included in the access request permits the execution of the I/O command in a case where the authorization information included in the access request is not tampered with and is issued from the authorization server, and the authorization information included in the access request matches the authorization information in the memory corresponding to the identifier in the memory matching the identifier included in the access request.

15. The storage system according to claim 14, wherein the identifier corresponding to the authorization information is generated by the authorization server.

16. The storage system according to claim 14, wherein the identifier corresponding to the authorization information is generated by the information storage apparatus.

* * * * *